United States Patent
Matsuoka et al.

(10) Patent No.: US 6,546,336 B1
(45) Date of Patent: *Apr. 8, 2003

(54) PORTABLE POSITION DETECTOR AND POSITION MANAGEMENT SYSTEM

(75) Inventors: Yoshio Matsuoka, Kanagawa-ken (JP); Akito Yamamoto, Saitama-ken (JP)

(73) Assignee: Jatco Corporation, Fuji (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/401,199

(22) Filed: Sep. 23, 1999

(30) Foreign Application Priority Data

Sep. 26, 1998 (JP) .................................... 10-288784

(51) Int. Cl.[7] .................... G01C 21/00; G01S 21/00; G06G 7/78
(52) U.S. Cl. .................. 701/213; 701/207; 701/216; 701/217
(58) Field of Search .................. 701/207, 216, 701/217, 213, 117

(56) References Cited

U.S. PATENT DOCUMENTS

| | | | | |
|---|---|---|---|---|
| 5,583,776 A | * | 12/1996 | Levi et al. | ................. 701/217 |
| 5,955,667 A | * | 9/1999 | Fyfe | ........................... 702/160 |
| 6,009,375 A | * | 12/1999 | Salumoto et al. | ........... 701/216 |
| 6,098,048 A | * | 8/2000 | Dashefsky et al. | ........... 705/10 |
| 6,114,995 A | * | 9/2000 | Ketchhum | ................... 342/457 |
| 6,132,391 A | * | 10/2000 | Onari et al. | ................. 600/595 |

* cited by examiner

Primary Examiner—Jacques H. Louis-Jacques
Assistant Examiner—Brian J. Broadhead
(74) Attorney, Agent, or Firm—Blank Rome Comisky & McCauley, LLP

(57) ABSTRACT

A portable position detector is equipped with a pedometer, a geomagnetic sensor, and an acceleration sensor. With the pedometer, the moved distance of a walker is detected by a calculation of "the number of steps×the length of a step". With the walking time per step detected with the acceleration sensor, the length of a step is corrected so that it corresponds to the walking state. The moved direction of the walker is detected with the geomagnetic sensor. With this, the moved position of the walker is accurately detected by self-contained navigation. Particularly, even in the case where the position detector is located in a forest or between buildings where a signal cannot be received from a global positioning system (GPS) due to high buildings, banks, and forests, the position detector with a portable size and weight applicable to a walker can know with a practically sufficient degree of accuracy the position of a person carrying this portable detector by self-contained navigation.

19 Claims, 20 Drawing Sheets

MOUNTAINEERING ROUTE

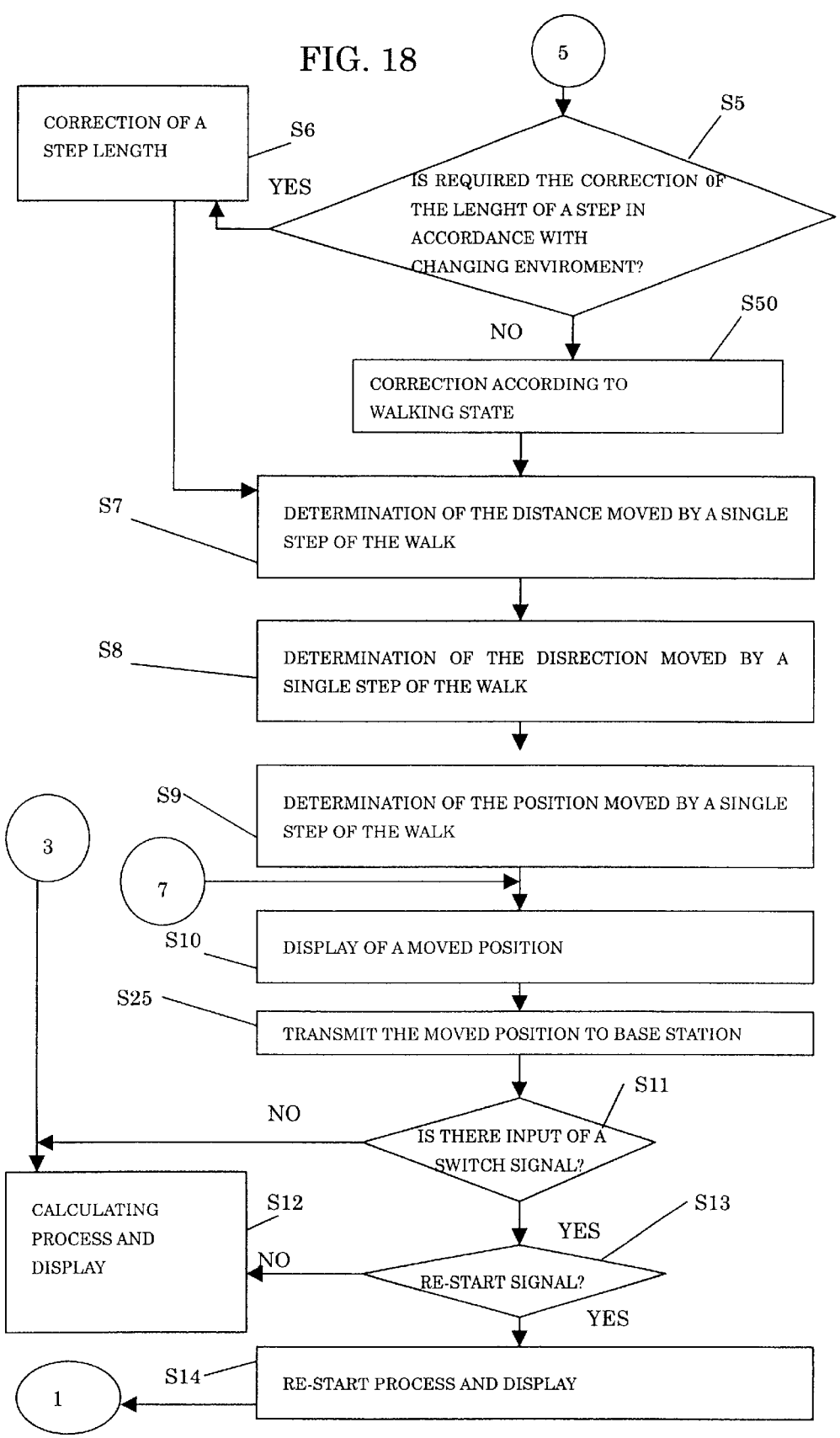

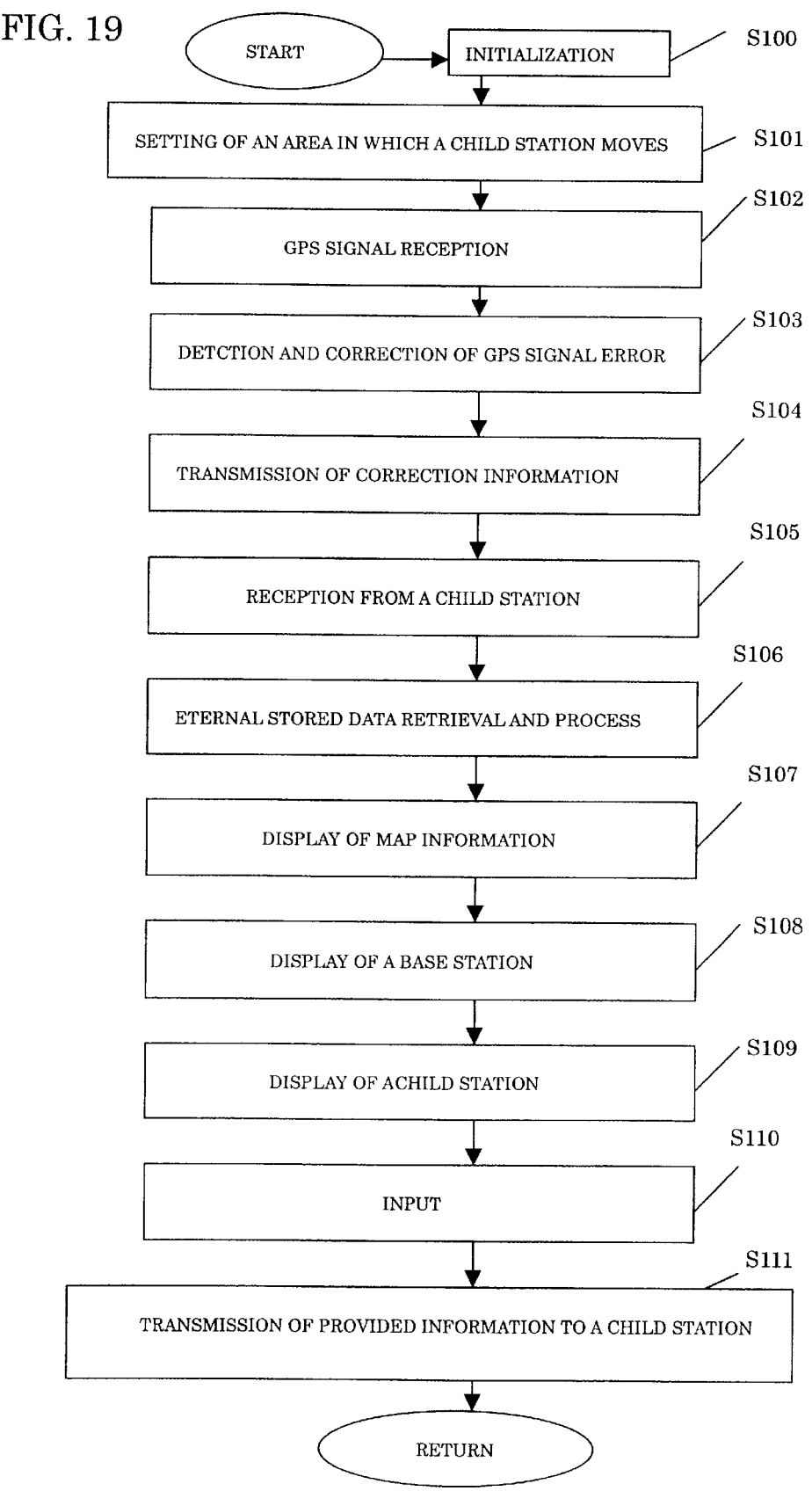

PORTABLE POSITION DETECTOR AND POSITION MANAGEMENT SYSTEM

FIELD OF THE INVENTION

This invention relates generally to a portable position detector and a position management system, and more particularly to a portable position detector capable of estimating the moved position of a walking body (e.g., a person) by self-contained navigation (number of steps×length of a step) and a position management system capable of managing the positions of a plurality of portable position detectors.

DESCRIPTION OF THE RELATED ART

A variety of vehicle navigational systems have been developed. At the beginning, self-contained navigation was used to provide information about the location of a vehicle. Later, self-contained navigation and a global positioning system (GPS) were combined into a hybrid system. The self-contained navigation employs an integration system. That is, the outputs from a speed sensor are integrated to detect the traveled distance of a vehicle, and the direction of the vehicle is detected from a direction sensor such as a gyro. The direction detected for each predetermined distance or time and the distance traveled during that period are cumulatively added to the starting point to detect the current position.

On the other hand, portable position detectors utilizing the GPS have recently been developed in order to render the measurement of the position of a walker possible. However, in the GPS, the position of a walker cannot be calculated unless information is received from 4 satellites (or 3 satellites although measurement accuracy is reduced). Since walkers walk on mountains and valleys and, even in a city, walk on a sidewalk that is easily shaded by buildings, the portable position detector is considerably disadvantageous in the above-mentioned reception, compared with vehicle navigational systems that are employed in vehicles traveling on a roadway in the central portion between buildings. In addition, a speed sensor cannot be simply applied to a walker, as in vehicle navigational systems.

Hence, the ideas of self-contained navigation for walkers, which employ a pedometer, have hitherto been proposed in Japanese Laid-Open Patent Publication Nos. HEI 2-216011, HEI 5-172579, HEI 8-68643, and HEI 9-89584.

However, the above-mentioned conventional methods have the following disadvantages when measuring the position of a walker. That is, the direction of a walker can always be detected at any point, while a pedometer can detect only whether or not a single step of a walk has been made. For example, the pedometer cannot continuously detect the moved distance of the center of gravity of a walker's body, which is continuously moved during a single step of a walk. Therefore, unlike vehicle navigational systems, at what point a moved distance and a moved direction are detected and used as a base of the calculation of the position of a walker is considerably important for the position detection of a walker based on self-contained navigation, because particularly when a walk involves a curve, the direction of the body easily changes even during movement of a single step of a walk.

In the above-mentioned 4 publications, Japanese Laid-Open Patent Publication No. HEI 9-89584 has no description of how a moved distance and a moved direction are determined.

On the other hand, the aforementioned Japanese Laid-Open Patent Publication No. HEI 8-68643 discloses that when a cantilever vibration meter (pedometer) with a weight outputs a pulse signal, the direction at that time is employed to calculate a moved distance. However, in this vibration meter (pedometer), a pulse signal is generated by the vertical movement of the center of gravity of a walker when the vibration meter strikes the weight that attempts to keep its position by inertia. Note that all pedometers are uniformly set so that a pulse signal is generated when the aforementioned gravity of center rises by a predetermined distance (about 15 mm). Also, since there is a great shock when a walker lands on a surface such as a road, the output of the vibration meter gives rise to hunting. For this reason, this vibration meter is constructed so that an electric circuit cuts the hunting (i.e., a signal at the time of landing is not used). Therefore, if a moved direction is detected at the time of the generation of this output pulse, the moved direction will often be detected when a walker begins to change a direction. As a result, it cannot be expected to select an optimal moved direction, and a measured position is often departed from the moved position.

Japanese Laid-Open Patent Publication Nos. HEI 2-216011 and HEI 5-172579 disclose that the direction of a walker is constantly detected and that it is judged whether or not the direction has been changed. If it is judged that the direction has been changed, the direction and distance up to this point are stored in order. As occasion demands, a position and a walked route are calculated from the stored data. This method judges a change in a moved direction by whether or not a measured direction has exceeded a reference range of direction that becomes a predetermined change of direction. However, when a measured direction exceeds the reference range of direction, there is no description of which direction of the moved directions being changed up to that time within the reference range of direction is employed in the measurement of a moved position.

In the aforementioned case, if the range of a reference value is narrow, the direction of a walker will constantly change and become complicated. At the same time, the information will be too much for the storage capacity, so the reference value must be set wide to some degree. If the reference value is set wide, the dispersion will become increasingly great, depending on the direction used before change of direction. Particularly, in a long and gentle curve or an inclined road, an error will be cumulated.

Also, in many cases, pedometers are constructed so that they count the number of steps and cumulate a value obtained by multiplying the number of steps by the length of a step, thereby displaying a walked distance. However, in practice, the step length of a walker is not constant. For this reason, this method has the disadvantage that the calculation accuracy of a walked distance is insufficient. For example, it is general that the length of a step varies between when the walker is hurried and when the walker walks slowly. However, in the conventional method, since a walked distance is calculated without giving consideration to variations in the length of a step due to a difference in a walking state, the accuracy of the walked distance is insufficient.

SUMMARY OF THE INVENTION

It is an object of the present invention to provide a portable position detector and a position management system that are capable of enhancing the accuracy of the position of a walking body detected by self-contained navigation, by accurately detecting the direction of the walking body even when GPS signals cannot be received or even when no GPS signals are received and also changing the length of a step in accordance with the walking state.

To achieve this end and in accordance with a first preferred form of the present invention, there is provided a portable position detector for detecting a moved position of a walking body. The portable position detector comprises: (1) walking-motion detection means for measuring a value related to a walking motion caused by movement of the walking body; (2) acceleration detection means for detecting acceleration of the value related to the walking motion caused by movement of the walking body; (3) moved-distance estimation means for estimating the moved distance of the walking body, based on both a number of steps detected from an output of the walking-motion detection means and a step length changed according to horizontal acceleration of the walking body or the magnitude of a change in the horizontal acceleration detected by acceleration detection means; (4) moved-direction detection means for detecting a direction or direction of movement of the walking body caused by movement of the walking body; (5) moved-direction determination means for detecting two points at which the walking body arrives substantially at a highest position and lands by walking, based on the walking motion caused by movement of the walking body that is output by the walking-motion detection means, and also for determining a moved direction at a specific point as a specific moved direction, the specific point being related to at least one of the detected two points and also being specified in a range between the highest-position arrival point and the highest position at which the waling body arrives substantially by the next walking; and (6) moved-position estimation means for estimating a position of the walking body after movement, based on the moved distance of the walking body estimated by the moved-distance estimation means and the specific moved direction determined by the moved-direction determination means.

Thus, the walking-motion detection means can easily grasp the highest-position arrival point and/or landed point of a walker by the output pattern of the geomagnetic sensor or the acceleration sensor. For the moved direction of the walker, the direction of the walker at a point in a range, in which the walker lands from the high-position arrival point and then raises the next foot to the highest position, is closer to the moved direction than the direction of the walker at a point at which the walker begins to raise the foot thereof. Therefore, if one of the aforementioned two points is grasped, then an optimal specific point in the aforementioned range can be selected at the one point or a point delayed from the one point by a predetermined time (i.e., a point related to the aforementioned point). As a result, a more superior moved direction can be selected.

The change of a step length is generally performed in consideration of the fact that in the case of a hurried walk the step length is large, in the case of a normal walk the step length is shorter than the hurried walk, and in the case of a slow walk the step length is shorter than the normal walk, and furthermore in consideration of the fact that these step lengths are considerably stable if viewed individually, although they depend mainly on height (foot length), the strength of a kick, and age. The above-mentioned three kinds of walks are sufficient for the step length. Although it cannot be said that there is no possibility that the length of a step will change continuously between the three kinds, the step length cannot continue to change continuously for a long time. Conversely speaking, a walker changes the time required for one step, depending on the degree of hurry. If this change becomes greater, the walker will change the step length to a step length peculiar to the person that is not fatigued. This changed step length is continuously repeated for a relatively long time in about three kinds mentioned above. Therefore, these step lengths may previously be measured individually and registered. Or during a walk, the walking time, the number of steps, and the walked distance obtained with a global positioning system (GPS) may be measured and registered.

As one method, the present invention determines a step length changed according to the horizontal acceleration of a walking body or the magnitude of a change in the acceleration. In this case, the vertical acceleration of a waling body and a change in this acceleration are also related to the horizontal acceleration and a change in the horizontal acceleration.

In another method, the time required for one step is detected, and according to the length of the detected time, the length of a step is changed in consideration of the busyness of the foot motion. In the former employing only acceleration, there is a need to view the gain and complicated motion of the acceleration and the cost is increased. On the other hand, the latter case has the advantage that measurements can easily be made.

The aforementioned moved-distance estimation means performs the process of estimating the moved distance of a walking body with the number of steps detected from the output of the walking-motion detection means, as a parameter. The number of steps in this case means that one step of a walk has been performed, and this is most desirable. However, the present invention is not limited to one step of a walk. Even in the case of an increased number of steps, the estimation of the moved distance of a walking body is possible. Normally, walking rhythm will be substantially constant, so the length of a step may be changed when it continuously changes considerably as a whole.

In accordance with the aforementioned first preferred form of the present invention, even in the case where the position detector is located in a forest or between buildings where a signal cannot be received from a global positioning system (GPS) due to high buildings, banks, and forests, the position detector with a portable size and weight applicable to a walker can know the position of a person carrying this portable detector by self-contained navigation. In this case, when the moved direction of a walker required for measurement is determined, easy detection becomes possible by grasping the highest-position arrival point or landed point of a body, such a foot or a waist, with a geomagnetic sensor or an acceleration sensor. If the moved direction at a point, which is in a range between a point related to the aforementioned point (i.e., the aforementioned point or a point delayed from the aforementioned point by a predetermined time) and the highest position that a walker arrives at by the next walking motion, is used as a specific moved direction for measurement, the moved direction of a walker can be determined at a point at which the direction of the body of a walker becomes closer to the moved direction. With this, measurement accuracy can easily be enhanced.

Also, by detecting changing environment, the length of a step can be changed according to a slopping road, etc. As a result, position accuracy can be further enhanced. In addition, the position detector according to the present invention can be produced at low cost.

Furthermore, the accuracy of a step length can be enhanced considerably by correcting the step length in accordance with the acceleration (i.e., the horizontal acceleration of a walker or a change in the horizontal acceleration) of a value related to motion caused by movement of the walker (walking body). Also, the calculation accuracy of the moved distance can be enhanced. Moreover, for example, if acceleration during walking is employed as a parameter, there is an advantage that the correction of a step length can easily be judged.

In a second preferred form of the present invention, the portable position detector comprises: (1) walking-motion detection means for measuring a value related to a walking motion caused by movement of the walking body; (2) acceleration detection means for detecting acceleration of the value related to the walking motion caused by movement of the walking body; (3) moved-distance estimation means for estimating the moved distance of the walking body, based on both a number of steps detected from an output of the walking-motion detection means and a step length changed in a direction where the step length becomes a wider step length as the time required for one step of a walk detected from an output of the walking-motion detection means becomes shorter; (4) moved-direction detection means for detecting a direction or direction of movement of the walking body caused by movement of the walking body; (5) moved-direction determination means for detecting two points at which the walking body arrives substantially at a highest position and lands by walking, based on the walking motion caused by movement of the walking body that is output by the walking-motion detection means, and also for determining a moved direction at a specific point as a specific moved direction, the specific point being related to at least one of the detected two points and also being specified in a range between the highest-position arrival point and the highest position at which the waling body arrives substantially by the next walking; and (6) moved-position estimation means for estimating a position of the walking body after movement, based on the moved distance of the walking body estimated by the moved-distance estimation means and the specific moved direction determined by the moved-direction determination means.

In accordance with the aforementioned second preferred form of the present invention, the length of a step is corrected according to the time required for one step of a walk. Therefore, in addition to the advantages of the aforementioned first preferred form of the present invention, this case, as compared with the case of employing acceleration alone, is advantageous in that there is no need to view the gain and complicated motion of acceleration, the cost can be reduced, and measurements can be made more easily.

In a third preferred form of the present invention, even when the time required for one step of a walk is shorter than normal time required for one step of a walk, the step length is corrected so that the time required for one step of a walk becomes shorter, if the horizontal acceleration of the walking body or a change in the acceleration detected by the acceleration detection means during this walking is less than a first predetermined value. Also, even when the time required for one step of a walk is longer than normal time required for one step of a walk, the step length is corrected so that the time required for one step of a walk becomes longer, if the horizontal acceleration of the walking body or a change in the acceleration detected by the acceleration detection means during this walking is greater than a second predetermined value.

In accordance with the aforementioned third preferred form of the present invention, the length of a step is corrected with the time required for a single step of a walk and the horizontal acceleration at this time (or the magnitude of a change in the acceleration). With this, the correction judgement of the step length is easy, the accuracy of the step length can be enhanced considerably, and the calculation accuracy of the moved position of a walker can be enhanced. In addition, if the walking time per step and the acceleration of a walker are employed as parameters, there is an advantage that the correction judgement of the step length is easy.

In a fourth preferred form of the present invention, the moved-distance estimation means counts the number of steps on the basis of a vertical geomagnetic change caused by walking of the walking body, detected by the walking-motion detection means, and also estimates the moved distance from a relation of the counted number of steps and the length of a step. Also, the step length is corrected based on the output of the acceleration detection means when the estimation is performed.

In accordance with the aforementioned fourth preferred form of the present invention, the moved-distance estimation means counts the number of steps, based on vertical geomagnetic change caused by the walking motion of a walking body, detected by the walking-motion detection means. Also, the moved distance of the walking body is estimated by multiplying the counted number of steps and the length of a step corresponding to this number of steps. In this estimation, the step length is corrected based on the output of the acceleration detection means. Therefore, the portable and small position detector of the present invention makes self-contained navigation possible, while enhancing the accuracy of a step length.

In a fifth preferred form of the present invention, the moved-direction determination means judges and detects the highest-position arrival point and/or the landed point from a vertical acceleration change caused by walking of the walking body, and also determines a moved direction of the walking body at a specific point as a specific moved direction, the specific point being at least one of the two points, or being a point delayed from the one point by a predetermined time.

In accordance with the aforementioned fifth preferred form of the present invention, the highest-position arrival point and/or the landed point of a walking body can be detected from vertical acceleration change caused by the walking motion of the walking body. A specific point is determined as the detected point or a point delayed from one of the two points by a predetermined time. This specific point can be set to a point at which the moved direction of the walking body has become closer to the actual direction after the moved direction has changed considerably. As described above, the point is in a range between the aforementioned highest-position arrival point and the highest position that the walker arrives at by the next walking motion. As a result, measurement accuracy can be enhanced with simple detection.

In a sixth preferred form of the present invention, the moved-direction determination means judges and detects the highest-position arrival point and/or the landed point from the vertical geomagnetic change caused by walking of the walking body, and also determines a moved direction of the walking body at a specific point as a specific moved direction, the specific point being at least one of the two points, or being a point delayed from the one point by a predetermined time.

In accordance with the aforementioned sixth preferred form of the present invention, the highest-position arrival point and/or the landed point of a walking body can be detected from geomagnetic change caused by the walking motion of the walking body. A specific point is determined as the detected point or a point delayed from one of the two points by a predetermined time. This specific point can be set to a point at which the moved direction of the walking body has become closer to the actual direction after the moved direction has changed considerably. As described above, the point is in a range between the aforementioned highest-position arrival point and the highest position that the walker arrives at by the next walking motion. As a result, measurement accuracy can be enhanced with simple detection.

In a seventh preferred form of the present invention, the predetermined time that is delayed by the moved-direction determination means is determined as a proportional portion of a walking step period from a walking cycle.

In accordance with the aforementioned seventh preferred form of the present invention, the previous walking cycle is detected. Based on this walking cycle, the aforementioned delay time for determining a specific point is calculated as a proportional portion of the walking step period that becomes a specific time at which an optimal direction is obtained. Therefore, even if the state of walking changed, an optimal specific point can be kept.

In an eighth preferred form of the present invention, the predetermined time that is delayed by the moved-direction determination means is set to a time at which the specific point goes to a state in which a landed foot and the next foot are positioned side by side.

In accordance with the aforementioned eighth preferred form of the present invention, the delay time is set to or near to a time at which the specific point goes to a state in which a landed foot and the next foot are positioned side by side. Therefore, in many cases, the direction of a walker specified for calculating a measured position is closest to a moved direction. As a result, measurement accuracy can be enhanced.

In a ninth preferred form of the present invention, the moved-distance estimation means detects changing environment from acceleration change or geomagnetic change caused by movement of the walking body, also changes the length of a step, based on the detected changing environment, and calculates the estimated distance and wherein the step length is corrected based on the output of the acceleration detection means when the calculation is made.

In accordance with the aforementioned ninth preferred form of the present invention, the moved-distance estimation means is constructed so that it can detect changing environment, such as an upward slope or a downward slope, from acceleration change or geomagnetic change caused by movement of a walker. Also, when an estimated distance is calculated, the length of a step is corrected based on the output of the acceleration detection means. Therefore, the step length for calculation of a moved distance can be changed to an optimal step length in accordance with changing environment, while the accuracy of the step length is being enhanced. Thus, measurement accuracy is enhanced.

In a tenth preferred form of the present invention, the correction of the step length is performed by making the step length shorter than a step length during walk on a level path, when it is judged by the detection of the changing environment that a walking path has a slope greater than a predetermined value.

In accordance with the aforementioned tenth preferred form of the present invention, when it is judged that a walking path has a slope greater than a predetermined value, the step length is made shorter than a step length during a walk on a level path. Therefore, the aforementioned correction of the step length according to changing environment can be made more accurate than a position on a map (a position on an X-Y plane viewed from a vertical direction (Z-direction)).

In an eleventh preferred form of the present invention, the portable position detector further comprises: a unit for receiving radio waves from global positioning system (GPS) satellites and measuring the current position of the walking body; and position correction means for correcting the current position estimated by the position estimation means, when the current position is measured with the unit.

In accordance with the aforementioned eleventh preferred form of the present invention, the measuring unit employing self-contained navigation has the function of the measuring unit employing global positioning system (GPS) satellites. Therefore, where GPS signals can be received, the position based on the GPS signals is used. On the other hand, where GPS signals cannot be received, the position based on self-contained navigation is used. With this, the position of a walking body can be measured at all times. Also, the error cumulated by self-contained navigation can be cancelled by the measured position based on the GPS signals. Thus, measurement accuracy can also be assured.

In a twelfth preferred form of the present invention, when the moved direction detected by the moved-direction detection means or the specific moved direction determined by the moved-direction determination means is within a predetermined direction width and also when it is judged by the detection of the changing environment that the cumulated number of steps or the cumulated moved-distance, in which a vertical amount of movement is within a predetermined width, is a straight-advanced walk on a level path which continues for a predetermined time or more, the correction of the step length in the moved-distance estimation means is performed by a value obtained by dividing a calculated distance by the cumulated number of steps, the calculated distance being calculated from positions measured at a starting point and an ending point of the straight-advanced walk on a level path by the unit.

In accordance with the aforementioned twelfth preferred form of the present invention, only when walking is substantially a straight-advanced walk on a level path and a predetermined length or more is walked, the distance calculated with GPS signals is divided by the cumulated number of steps during the walk. In this manner, the step length is corrected. Therefore, the step length can be set to an optimal step length. Since the distance calculated with GPS signals becomes a straight-line distance, the calculation is made under a condition that walking is substantially a straight-advanced walk on a level path and a condition that walking continues over a predetermined distance or more in consideration of an error in the measurement and a change in the step length. Therefore, an enhancement in the measurement accuracy can be expected.

A position management system according to the present invention is equipped with a portable position detector for detecting a moved position of a walking body, and a base station. The portable position detector includes: (1) walking-motion detection means for measuring a value related to a walking motion caused by movement of the walking body, (2) acceleration detection means for detecting acceleration of the value related to the walking motion caused by movement of the walking body, (3) moved-distance estimation means for estimating the moved distance of the walking body, based on both a number of steps detected from an output of the walking-motion detection means and a step length changed according to either the time required for one step of a walk detected during the walking motion, or horizontal acceleration of the walking body detected by acceleration detection means, or the magnitude of a change in the horizontal acceleration, (4) moved-direction detection means for detecting a direction or direction of movement of the walking body caused by movement of the walking body, (5) moved-direction determination means for detecting two points at which the walking body arrives substantially at a highest position and lands by walking, based on the walking motion caused by movement of the walking body that is output by the walking-motion detection means, and also for determining a moved direction at a specific point as a specific moved direction, the specific point being related to at least one of the detected two points and also being specified in a range between the highest-position arrival point and the highest position at which the waling body arrives substantially by the next walking, (6) moved-position estimation means for estimating a position of the walking body after movement, based on the moved distance of the walking body estimated by the moved-distance estimation means and the specific moved direction determined by the moved-direction determination means, and (7) transmission means for transmitting at least one piece of information of output information from the walking-motion detection means, from the moved-distance estimation means, from the moved-direction determination means, and from the moved-position estimation means. The base station includes: (1) reception means for receiving the output information transmitted by the transmission means of the portable position detector and (2) display means for displaying a moved position of the portable position detector, based on the information from the reception means.

In accordance with the aforementioned position management system of the present invention, the aforementioned portable position detector (child station) is provided with transmission means in order to transmit position information to the base station (parent station). Therefore, this management system can grasp and manage the positions of respective child stations at the base station, while enhancing the accuracy of a step length at the child station side.

In the position management system, at least a portion of information necessary for a process of calculating a position of the portable position detector on the basis of a GPS signal received by the portable position detector is transmitted from the portable position detector to the base station. Also, the base station receives the portion of information and performs the position calculating process. In the portable position detector, a calculating process is shared with the portable position detector and the base station so that the base station executes processes other than the position calculating process.

In accordance with the aforementioned position management system, a portion of the information obtained by the child station is transmitted to the base station by the transmission means, and a calculating process is performed at the base station. The child station executes processes other than the calculating process. Therefore, this management system can simplify the construction of the child station, while enhancing the accuracy of a step length at the child station side. Of course, the calculation result in the base station can be transmitted to the child station so that the child station can utilize it.

BRIEF DESCRIPTION OF THE DRAWINGS

The above and other objects and advantages will become apparent from the following detailed description when read in conjunction with the accompanying drawings wherein:

FIG. 18 is a flowchart showing the control program of the portable position detector according to the third embodiment of the present invention; and FIG. 19 is a flowchart showing the control program of the base station.

DETAILED DESCRIPTION OF THE PREFERRED EMBODIMENTS

An embodiment of the present invention, applied to a portable position detector that is used by individuals, will hereinafter be described in reference to the drawings.

Figure 1:
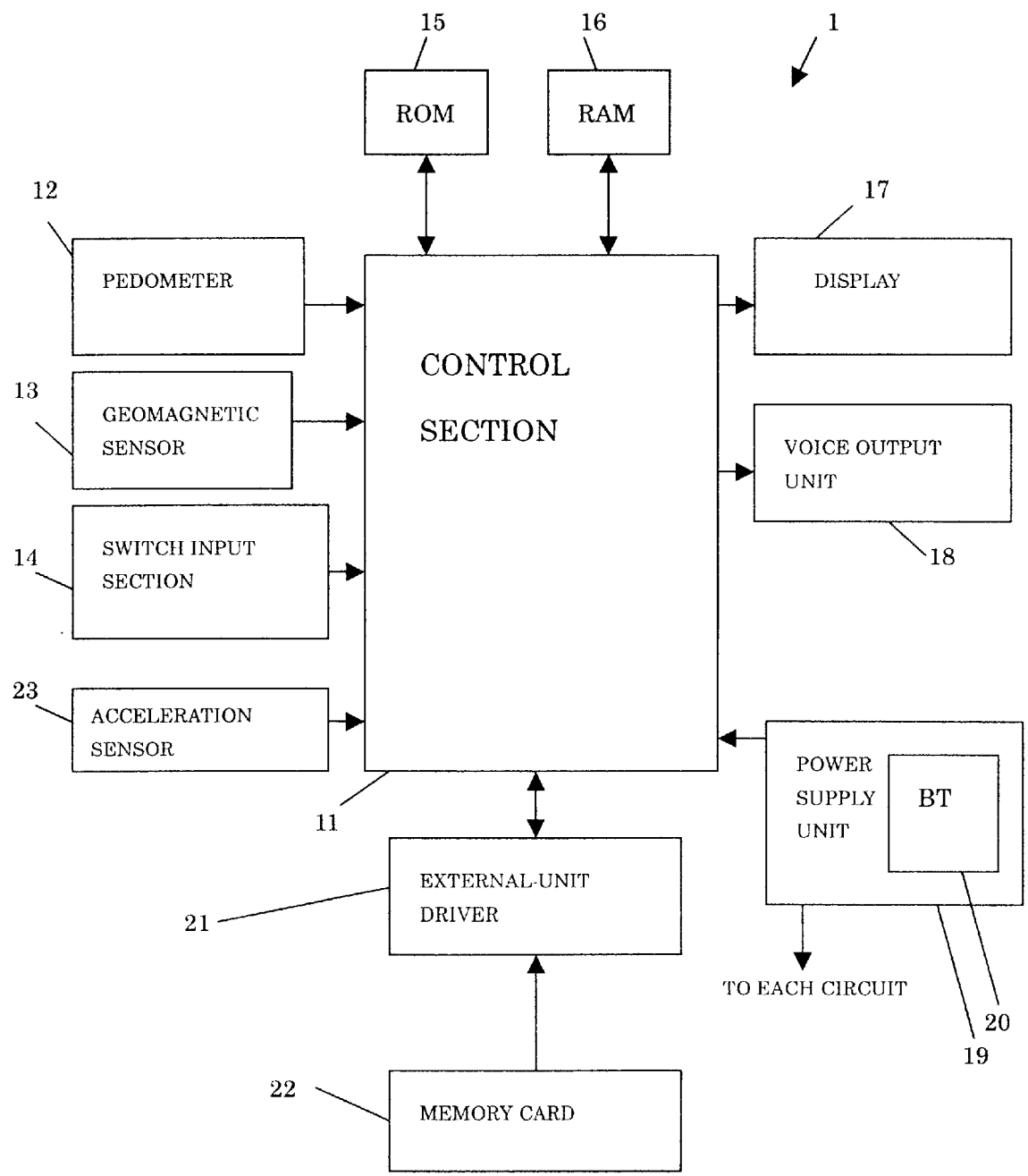
FIG. 1 is a block diagram of a portable position detector according to a first embodiment of the present invention.

FIG. 1 shows a portable position detector constructed according to a first embodiment of the present invention. This embodiment is applied to a walking body such as a person.

In FIG. 1, reference numeral 1 denotes a portable position detector. The portable position detector 1 is roughly constructed of a control section 11, a pedometer 12, an acceleration sensor 23, a geomagnetic sensor 13, a switch input section 14, a read-only memory (ROM) 15, a random access memory (RAM) 16, a display 17, a voice output unit (e.g., speaker) 18, and a power source circuit 19. The power source circuit 19 is added as occasion demands. This is also true of other embodiments to be described later. The portable position detector 1 is further constructed of an incorporated battery 20 and an external-unit driver 21.

Figure 2:
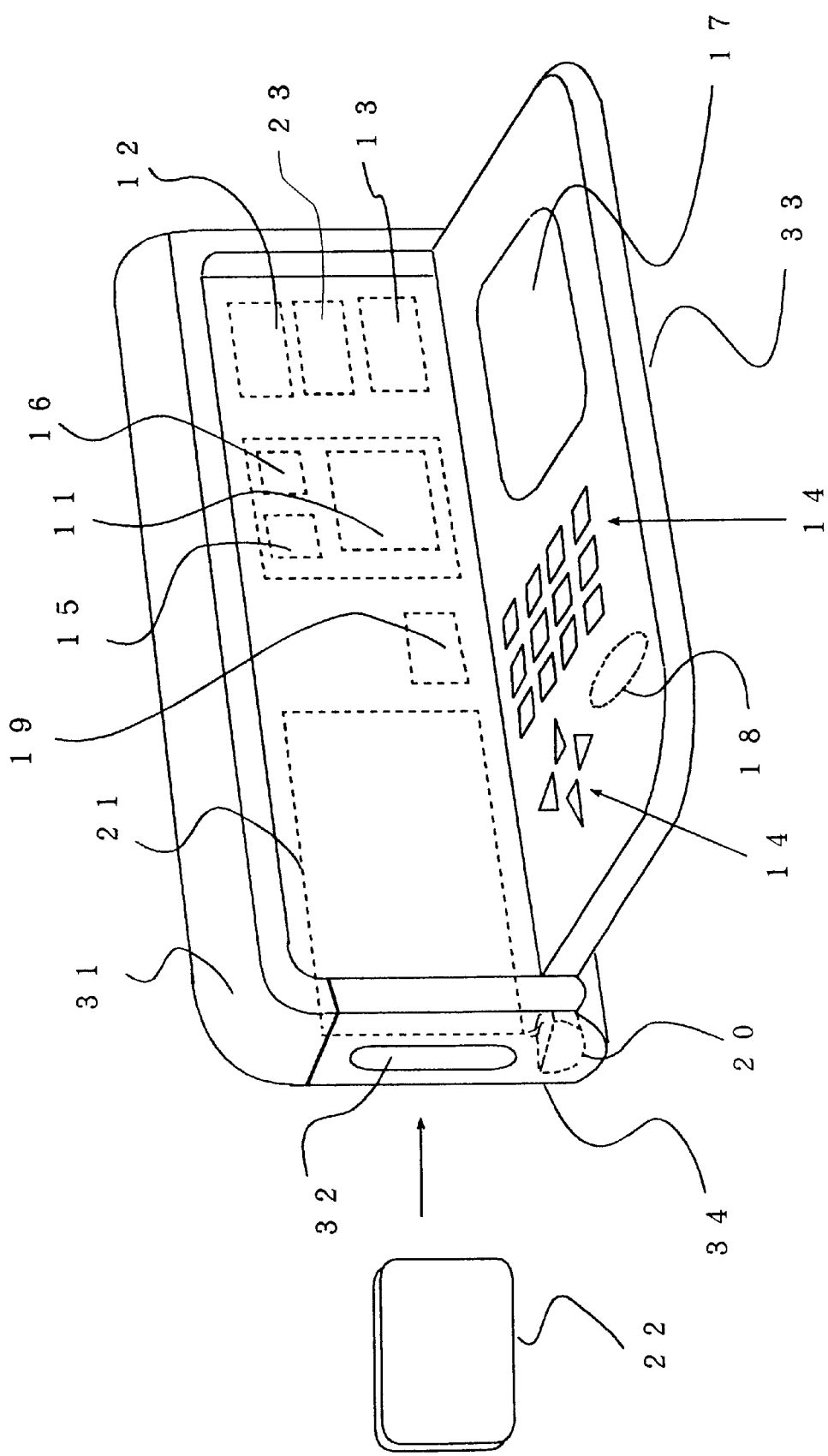
FIG. 2 is a perspective view showing the portable position detector.

The pedometer 12 (walking-motion detection means) detects the number of steps a person walks. The pedometer 12 uses, for example, a pedometer that electrically detects mechanical motion by using a weight. Also, an electronic pedometer, which incorporates a coil or a magnetic sensor, may be used. The electronic pedometer has a pulse amplification circuit and a counter. Pulses, generated by the electromagnetic induction of the coil (or magnetic sensor) and geomagnetism caused by walking or traveling, are cumulated as the number of steps. The pedometer 12 is small in size and light in weight and is housed and arranged interiorly of the main body 31 of the portable detector 1, as shown in FIG. 2.

Furthermore, the pedometer 12 may use a sensor element of the solid state type in which a stress element is provided on a thin-film cantilever formed on a silicon substrate. A change in the electric characteristic value of the stress element is compared with a reference level to generate a pulse signal. In this case the pedometer 12 is advantageous in that subminiaturization is achievable and digital output is easily obtainable. In addition, the pedometer 12 may be a type in which an acceleration sensor detects the motion of a walker electrically. The output signal of the acceleration sensor is converted to electrical pulses corresponding to a specific motion of the walker, and these converted pulses are counted. Furthermore, the pedometer 12 may use other small and lightweight types in which digital output is obtained. For instance, the pedometer 12 may use a component, called an acceleration sensor or a geomagnetic sensor.

In short, any principle may be employed if it can electrically detect that a single step of a walking motion has been performed.

Moreover, the pedometer 12 may use, for example, a commercially available pedometer separately and it may be constructed so that the output signal thereof is input to the control section 11 via a cable and a connector.

The acceleration sensor (or acceleration detection means) 23 is used for detecting the walking state of a person (walker) with acceleration as a parameter. For example, an acceleration sensor for electrically detecting the acceleration of a walking motion is used. The output signal of the acceleration sensor is converted to electrical pulses corresponding to a specific motion of the walker and is output.

Here, in the walking state of a walker, the walking time per step (time taken for a walker to take a single step) and the horizontal acceleration of the walker (or a change in this acceleration) are detected.

The acceleration sensor 23 measures at least the number of steps and the walking time per step in the vertical direction. It also makes longitudinal measurements (vertical measurements although they are difficult in certain circumstances), which are used for quick judgement and correction.

To make a long story short, the acceleration sensor 23 may employ any principle if it can electrically detect the walking time per step and the horizontal acceleration of a walker (or a change in this acceleration), when the walker makes a single step of a walking motion. Also, the acceleration sensor 23 may use, for example, a commercially available acceleration sensor separately and it may be constructed so that the output signal thereof is input to the control section 11 via a cable and a connector.

Note that as the pedometer 12 and acceleration sensor 23, a single acceleration sensor may be employed and the output waveform thereof may be processed so that the functions of the pedometer 12 and acceleration sensor 23 are realized.

The control section 11 measures a value (here, the number of steps) related to motion caused by movement of a person, based on a signal from the pedometer 12, in accordance with a program stored in the ROM 15, and estimates a moved distance. The estimation of the moved distance is performed by a calculation of (the number of steps)×(the length of a step). When this estimation is performed, the length of a step is corrected based on a signal from the acceleration sensor 23. There are the three following processes in the correction of the length of a step:

(a) With the horizontal acceleration during one step of a walk as center, the length of a step is corrected. Or, the magnitude of a change in the acceleration may be added. That is, this is the process of correcting the length of a step with acceleration as center. In accordance with the magnitude of acceleration, the length of a step is corrected.

(b) In accordance with the time required for a single step of a walk, the length of a step is corrected.

(c) With the time required for one step of a walk and the horizontal acceleration at this time as center, the length of a step is corrected. Or, the magnitude of a change in the acceleration may be added. That is, this is the process of performing judgement and correction with acceleration with walking time per step as center. For example, walking time per step (walking rhythm) is calculated from the acceleration of a walker. Then, it is judged whether the walking time per step is fast, normal, or slow. Based on this judgment, the length of a step is corrected, and according to the acceleration, it is further corrected.

In this embodiment, although the above-mentioned process of (c) is performed, the above-mentioned processes of (a) and (b) may be performed, or a combined process of both may be performed.

Therefore, the pedometer 12, control section 11, ROM 15, and RAM 16 constitute moved-distance estimation means, moved-direction determination means, and moved-position estimation means.

The geomagnetic sensor 13 detects the direction of movement of a person (direction moved by a person). The geometric sensor 13 uses a small and lightweight magnetic sensor that detects the magnetic field of the earth to detect which direction the sensor itself points to with respect to the east-west and north-south directions. As a sensor like this, the geomagnetic sensor 13 employs, for example, a digital 3-axis magnetic sensor HMR2300 (trade name) manufactured by Honeywell. The geomagnetic sensor 13 constitutes moved-direction detection means for detecting a direction of movement caused by movement of a person. The moved-direction detection means is not limited to a geomagnetic sensor. For example, a gyrocompass and other sensors may be used if they are small in size and light in weight.

Also, since the geomagnetic sensor 13 can detect a vertical change in the geomagnetism caused by the walking of a person, this geomagnetic change can judge unevenness, the highest-position arrival point of the person from a lowest value which continues for a predetermined time, and the landed point of the person. At this point, or at a point delayed from one of these points by a set time, the moved-direction determination means determines the moved direction at that point as a specific moved direction. Therefore, the geomagnetic sensor 13 constitutes part of the moved-direction determination means.

The switch input section 14 includes a manipulation key for performing the manipulation of the portable position detector 1, and a control key for performing the setting of a destination, setting of a route, and a change of an area on the map information displayed on the screen of the display 17. The switch input section 14 also includes an area change key consisting of page-up and page-down keys for moving a map area on the screen of the display 17 in the vertical direction. The switch input section 14 further includes various switches necessary for manipulation (e.g., a ten-key pad capable of inputting numerical characters, a power switch, and a memory key). In accordance with a predetermined spot (e.g., a destination spot) that a person attempts to move to, the switch input section 14 is used for specifying the coordinate position of that spot on a map as a point, also specifying any of the surrounding directions represented in east-west and south-north during movement, and furthermore, performing the resetting of a starting point (including a reset operation).

The control section 11 receives a walk signal from the pedometer 12 that detects the walking of a person for each step. The control section 11 employs the received walk signal in the calculation of a moved distance so that a previously set step length value corresponds to each one step. Also, with the time required for one step of a walk and the horizontal acceleration at this time (or magnitude of a change in the acceleration), as center, the control section 11 performs the process of correcting the length of a step. Furthermore, the control section 11 also receives a direction signal representing which of east-west and south-north directions a walker points to, detected with the geomagnetic sensor 13. Moreover, the control section 11 detects the vertical change of the walker and accordingly the state of the up-and-down motion of the foot from the vertical change in the geomagnetism detected with this geomagnetic sensor 13. Then, when the control section 11 detects that the walking state (i.e., the up-and-down motion of the body or foot) has gone to a predetermined state, the control section 11 determines the direction of the aforementioned walker's body at this point as the moved direction. The predetermined state here means a point at which the foot or waist of a walker arrives at substantially the highest position. Also, it means that the foot or waist of a walker is in a range between a point delayed from the landed point by a predetermined time and the next landed point.

Furthermore, it means that the foot or waist of a walker is in a range between a point delayed from the highest-position arrival point by a predetermined time and the highest position that the walker arrives at by the next walking motion. Therefore, the control section 11 calculates the movement of a position caused by the current one step of the walk from the determined length and direction of the current one step of the walk and adds the calculated movement to the previous position, thereby determining the current position.

Note that while the length of a step employed in the aforementioned calculation employs the previously input numeric value of the step length of a normal walk on a level path, the numeric value may be changed according to environment and walking conditions to be described later. For example, the numeric value may be changed when a user walks on an uphill road. Furthermore, the control section 11 displays the thus-obtained moved-position information on the display 17 and performs the required calculating process for outputting necessary voice information to the voice output unit 18. Moreover, the control section 11 displays a map on the screen of the display 17 and controls it, based on information (e.g., map information about a moving route, etc.) from the memory card 22 that is input via the external-unit driver 21. The control section 11 is constructed of a microcomputer including a central processing unit (CPU), and controls the aforementioned control in accordance with a control program stored in the ROM 15 (see flowcharts to be described later).

The display 17 displays information relevant to the position of a person estimated by the control section 11 and therefore constitutes display means. The display 17 uses, for example, a small liquid crystal display of a low dissipation power type (which may be either monochromatic or color) The voice output unit 18 gives a voice-synthesized sound, based on a voice signal synthesized by the control section 11, and consists, for example, of a speaker. This speaker is constructed so that it can provide information to a walker even when a cover portion 33 is not opened.

The external-unit driver 21 consists, for example, of a PCMCIA control circuit and performs the process of transmitting data between it and the memory card 22. The memory card 22 stores map information relevant to the moving route of a person and constitutes map-information storage means.

The ROM 15 has previously stored various programs and necessary data for the position calculating process that is performed by the control section 11. The RAM 16 has a first memory area in which the information input by the switch input section 14 must be stored temporarily, a second memory area in which information about the destination that a person attempts to move to, specified by manipulation of the switch input section 14, is temporarily stored, a work area, and so on.

Reference 20 denotes an incorporated battery, which supplies necessary power to each of the above-mentioned circuits. Note that if necessary, a power source circuit 19, etc. maybe added for changing voltage.

FIG. 2 illustrates the construction of the portable position detector 1. In the figure, the portable position detector 1 has a main body 31. The main body 31 is small in size and light in weight and is formed into approximately the shape of a box so that a person can easily carry it. The display 17 with a rectangular screen, the switch input section 14, and the voice output unit 18 are disposed on the front side of the main body 31. Inside the main body 31, the pedometer 12, acceleration sensor 23, geomagnetic sensor 13, external-unit driver 21 for a memory card, and the control section 11 with both the ROM 15 and RAM 16 are incorporated. Voltage is supplied from the battery 20 incorporated in the lower portion of the main body 31.

The left portion of the main body 31 is provided with a closable cover 34, and an insertion port 32 for the memory card 22 and an insertion port for the battery 20 are formed inside the closable cover 34. With this, the replacement of the incorporated battery 20, the inspection of the external-unit driver 21 and the like become easy.

It is preferable that the portable position detector 1 be fixed to a person (walker), for example, a waist belt so that it is not displaced with respect to the body. For that reason, a belt anchoring member attachable to a waist belt is provided on the back surface of the main body 31, although not shown. With this, the portable position detector 1 can easily be removed from a waist belt. Likewise, it can easily be attached to the waist belt.

Now, the operation will be described.

Figure 3:
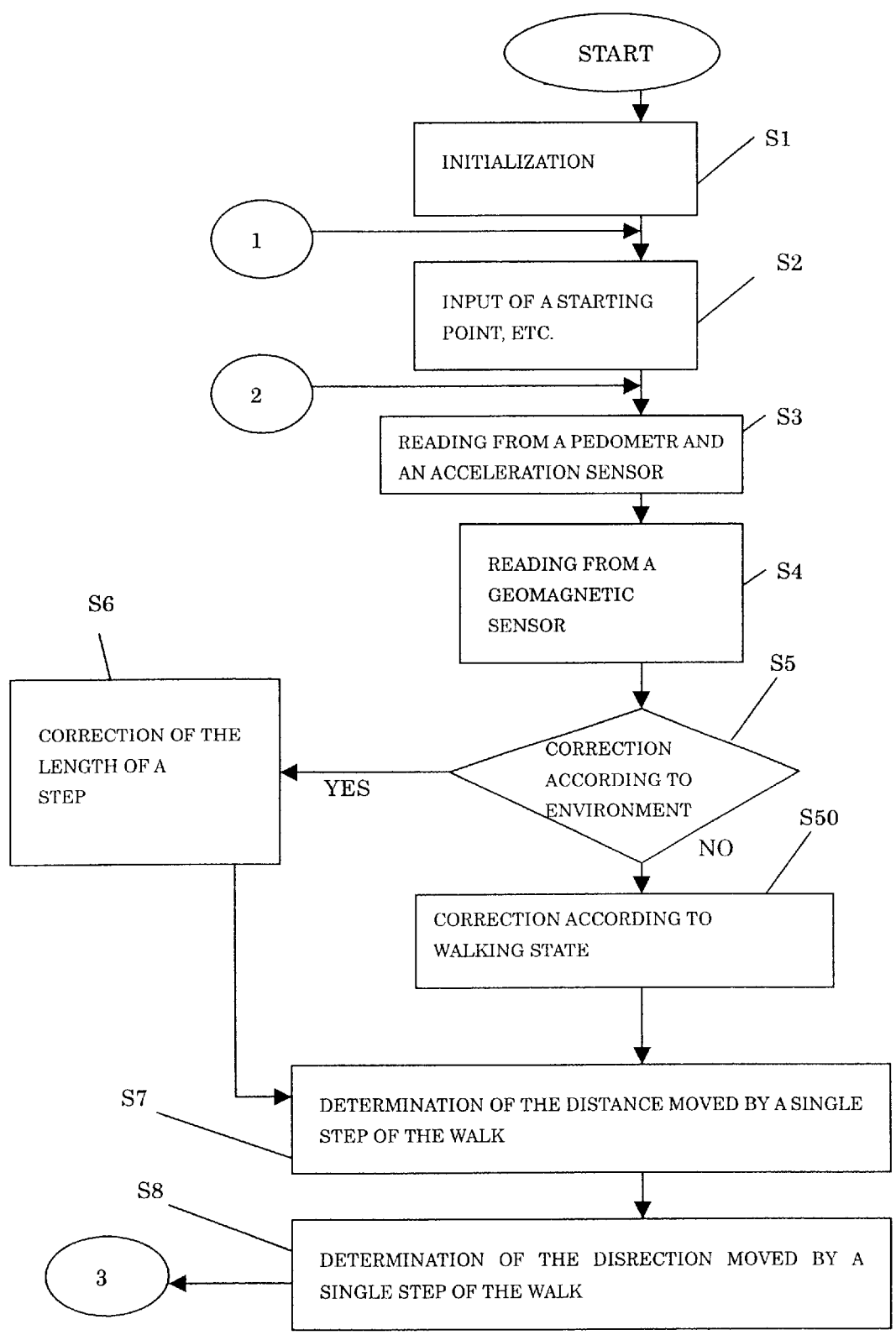
FIG. 3 is a flowchart showing the control program of the portable position detector.
Figure 4:
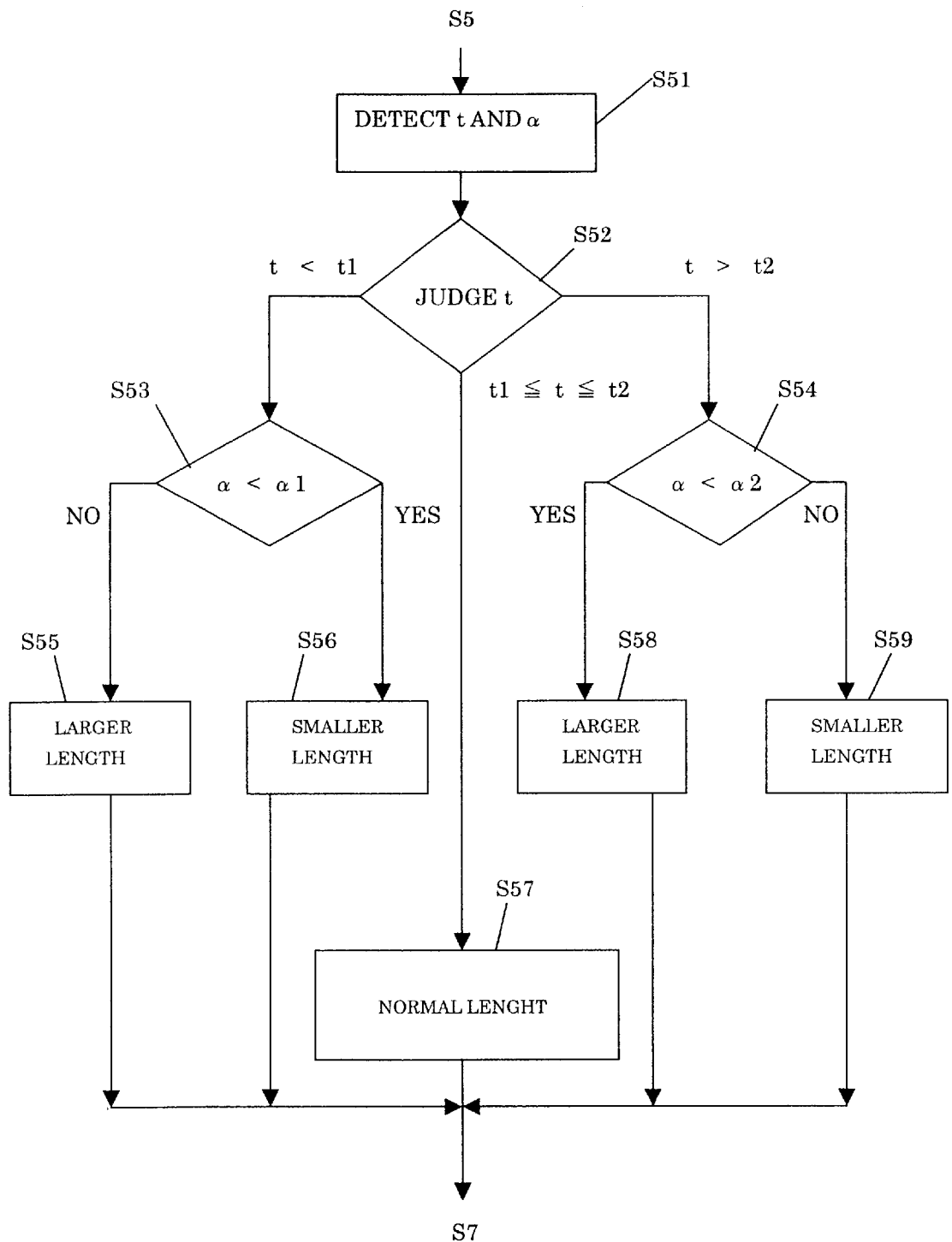
FIG. 4 is a flowchart showing the control program of the portable position detector.

FIGS. 3 and 4 are flowcharts showing the control program of the portable position detector 1, respectively.

This control program is executed if power to the portable position detector 1 is turned on. If the control program starts, initialization is first performed in step S1. In the initialization, the portable position detector 1 is automatically reset and predetermined initialization processes, such as the process of clearing the work area of the RAM 16 and the like, are performed.

In step S2, a starting point, etc. are input. That is, in the initialization, a person carrying the portable position detector 1 manually inputs a starting point of movement, an average length of a step during a walk on a level path, and so on. At this time, for example, by displaying "Set a starting point for start of movement" on the screen of the display 17, a person is urged to perform the initialization. Note that at this point, the memory card 22 (which stores map information about an area in which a walker moves, etc.) must have been inserted in the main body 31. In the case where the memory card 22 has not been inserted, a message that "Insert the memory card 22 for an area where a walker moves, if necessary" may be displayed on the screen of the display 17.

The setting of the starting point of movement may be performed by specifying the starting point onto a map as a point or by inputting the position coordinates (latitude and longitude). For example, as shown by an example of a moving route in FIG. 7A, the starting point may be input as a point. Also, in the initialization, the length of the step of a person is input. The input of the step length may be performed by inputting figures with a ten-key pad, or may be automatically set by selecting the height of a person carrying the detector 1 from a range of grouped heights displayed on the screen of the display 17. This is based on the fact that the length of a step is generally related to the height of a person. It is a matter of course that the input of the step length may be performed by other methods.

Furthermore, in the initialization, the measurement of a time is also started.

Next, in step S3 a signal from the pedometer 12 and a signal from the acceleration sensor 23 are input and in step S4 a signal from the geomagnetic sensor 13 is input. Next, in step S5 it is judged whether or not the correction of the length of a step is required according to changing environment. That is, depending upon changing environment, the length of a step is influenced, for example, when a person goes up or down a sloping road or stairs. As a result, since the step length differs from an average step length during a normal walk on a level path, a large error will occur in the moved length calculated based on the average step length. Hence, the length of a step can be changed according to detected changing environment. The detection of changing environment is performed by judging geomagnetic change corresponding to a sloping road, upstairs, downstairs and the like, based on a signal (Z-direction: height direction) from the geomagnetic sensor 13. When there is a slope greater than a predetermined value, the control section 11 advances to step S6 and corrects the length of a step to less than a numeric value that is used during a walk on a level path.

This correction may employ correction values grouped according to the magnitudes of slopes. Note that, since a map is depicted on the X-Y plane viewed from the vertical direction (Z-direction), generally it is often preferable that the numeric value of the length of a step be corrected to a smaller value when there is a slope greater than a predetermined value.

In step S6, if the control section 11 ends the correction of the step length, it advances to step S7.

When, on the other hand, a slope is less than the above-mentioned predetermined value, the control section 11 advances to step S50 without correcting the length of a step in accordance with the above-mentioned changing environment.

In step S50 the process of correcting the length of a step in accordance with the walking state based on a signal from the acceleration sensor 23 is performed. The details of step S50 are shown in FIG. 4.

In FIG. 4, in step S51 the walking time t per step (walking rhythm) and the horizontal acceleration $\alpha$ of a walker at this time are detected. Then, in step S52 the walking time t per step is judged. More specifically, when the walking time t per step is less than a first predetermined time t1 (t<t1) the control section 11 judges this walking to be "hurried" and advances to step S53. When the walking time t per step is between the first predetermined time t1 and a second predetermined time t2 (t1≦t≦t2), the control section 11 judges this walking to be "normal" and advances to step S57. When the walking time t per step is greater than the second predetermined time t2 (t>t2) the control section 11 judges this walking to be "slow" and advances to step S54.

Next, the process of judging the horizontal acceleration $\alpha$ is performed. In step S53 it is judged whether or not the horizontal acceleration $\alpha$ (which also correlates with the vertical direction) or a change in the acceleration is less than a first predetermined acceleration $\alpha 1$ ($\alpha<\alpha 1$). When $\alpha$ is $\alpha<\alpha 1$, in step S56 the length of a step is corrected to a smaller length, even when the walking time per step is hurried. When $\alpha$ is not $\alpha<\alpha 1$, instep S55 the length of a step is corrected to a larger length, even when the walking time per step is hurried.

On the other hand, when the walking time t per step is normal, in step S57 the length of a step is corrected to a normal length.

Furthermore, in step S54 it is judged whether or not the horizontal acceleration $\alpha$ (which also correlates with the vertical direction) or a change in the acceleration is greater than a second predetermined acceleration $\alpha 2$ ($\alpha 2<\alpha 1$). When $\alpha$ is $\alpha>\alpha 2$, in step S58 the length of a step is corrected to a larger length, even when the walking time t per step is slow. When $\alpha$ is not $\alpha>\alpha 2$, in step S59 the length of a step is corrected to a smaller length, even when the walking time t per step is slow.

Note that there is a possibility that, depending on the setting of $\alpha 1$ and $\alpha 2$, the contents in steps S56 and S58 will become close to the normal length correction. However, practically, since it is seldom that the horizontal acceleration $\alpha$ or a change in the acceleration continues for a long time during walking, $\alpha 1$ and $\alpha 2$ can be properly set considering this fact.

Thus, even if the walking time t per step became faster, the length of a step will be corrected to a smaller length without being increased, when the acceleration of a walker is less than the first predetermined acceleration $\alpha 1$. The acceleration here means the acceleration of a kick during walking, and it is desirable that this acceleration be detected with horizontal gravity, but it may be detected with vertical gravity. On the other hand, even if the walking time t per step were slow, the length of a step will be corrected to a larger length when the acceleration of a walker (acceleration of a kick during walking as in the above case) is greater than the second predetermined acceleration $\alpha 2$ (which is greater than $\alpha 1$). Thus, by judging the length of a step with the walking time t per step as center and also correcting the judgement of the length of a step in accordance with the acceleration $\alpha$ of a walker, the correction judgement of the step length becomes easy and the accuracy of the step length can be enhanced considerably. If the control section 11 ends the process in FIG. 4, it advances to step S7 in FIG. 3.

Note that if the aforementioned acceleration $\alpha$ is divided into too many cases, only acceleration will be sufficient and the significance of the walking time per step will be reduced or lost. In such a case of acceleration α alone, it is technically complicated.

Also, there is a need to widen the range of the acceleration sensor and the cost tends to be increased inevitably. On the other hand, it is easy to detect the walking time t per step, and if the acceleration α is greater than and less than the aforementioned predetermined value, an inexpensive sensor in a narrow range can be employed.

Figure 5A:
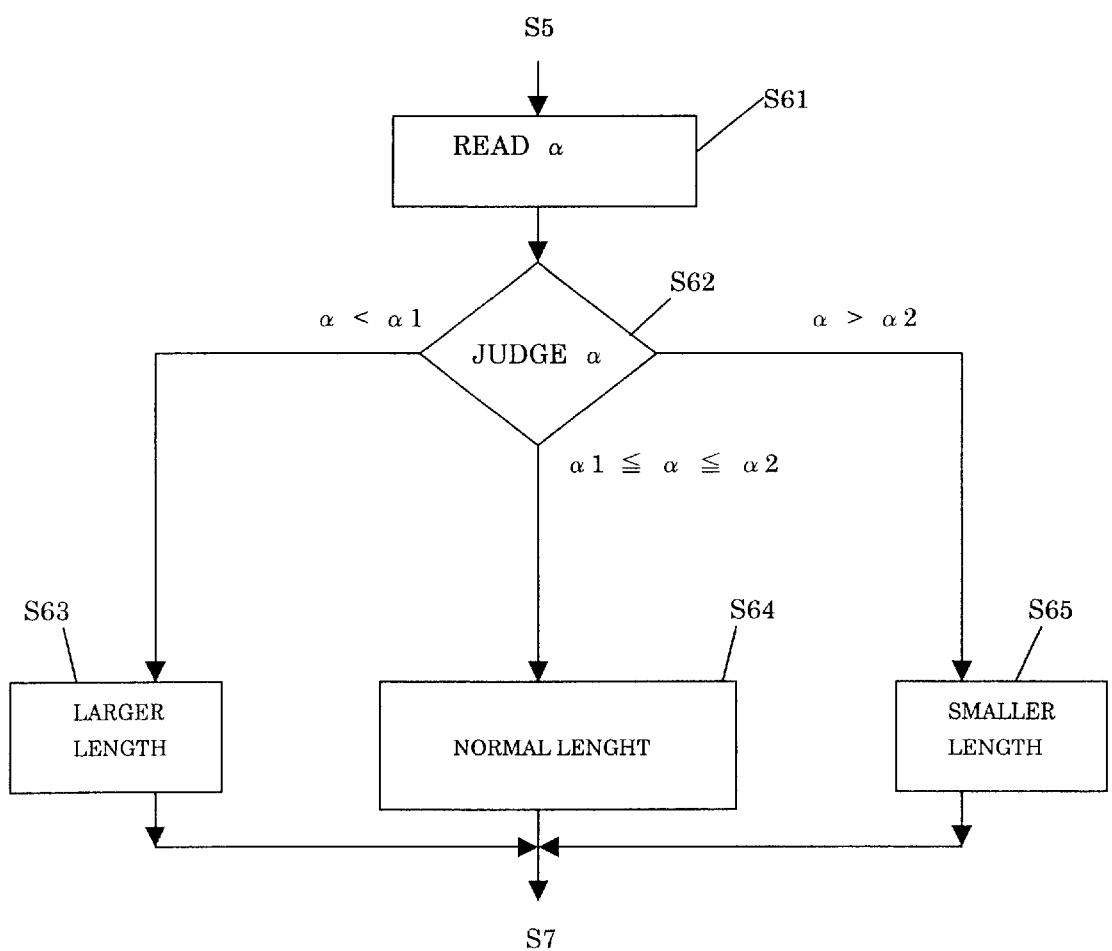
FIGS. 5A and 5B are flowcharts showing the control program of the portable position detector.

The contents of the process in step S50 are not limited to the example shown in FIG. 4. For example, the process shown in FIG. 5 is also possible. FIG. 5A shows that the horizontal acceleration (which also correlates with the vertical direction) during one step of a walk or a change in the acceleration is judged to correct the length of a step. That is, in FIG. 5A, in step S61 the horizontal acceleration α during one step of a walk is read in. (The horizontal acceleration α also correlates with the vertical direction and includes a change in the acceleration. The same applies for the following embodiments). Then, in step S62 the acceleration α is judged. When it is greater than a first predetermined value α1, in step S63 the length of a step is corrected to a larger length. When the acceleration α is between the first predetermined value α1 and a second predetermined value α2 ($α1 \leq α \leq α2$), the control section 11 judges this walking to be "normal" and advances to step S64. In step S64 the length of a step is corrected to a normal length. When the acceleration α is less than the second predetermined value α2 ($α < α2$), in step S65 the length of a step is reduced to a smaller length.

Thus, by judging the horizontal acceleration a during one step of a walk and correcting the step length, the correction judgment of the step length becomes easy and the accuracy of the step length can be enhanced considerably.

Figure 5B:
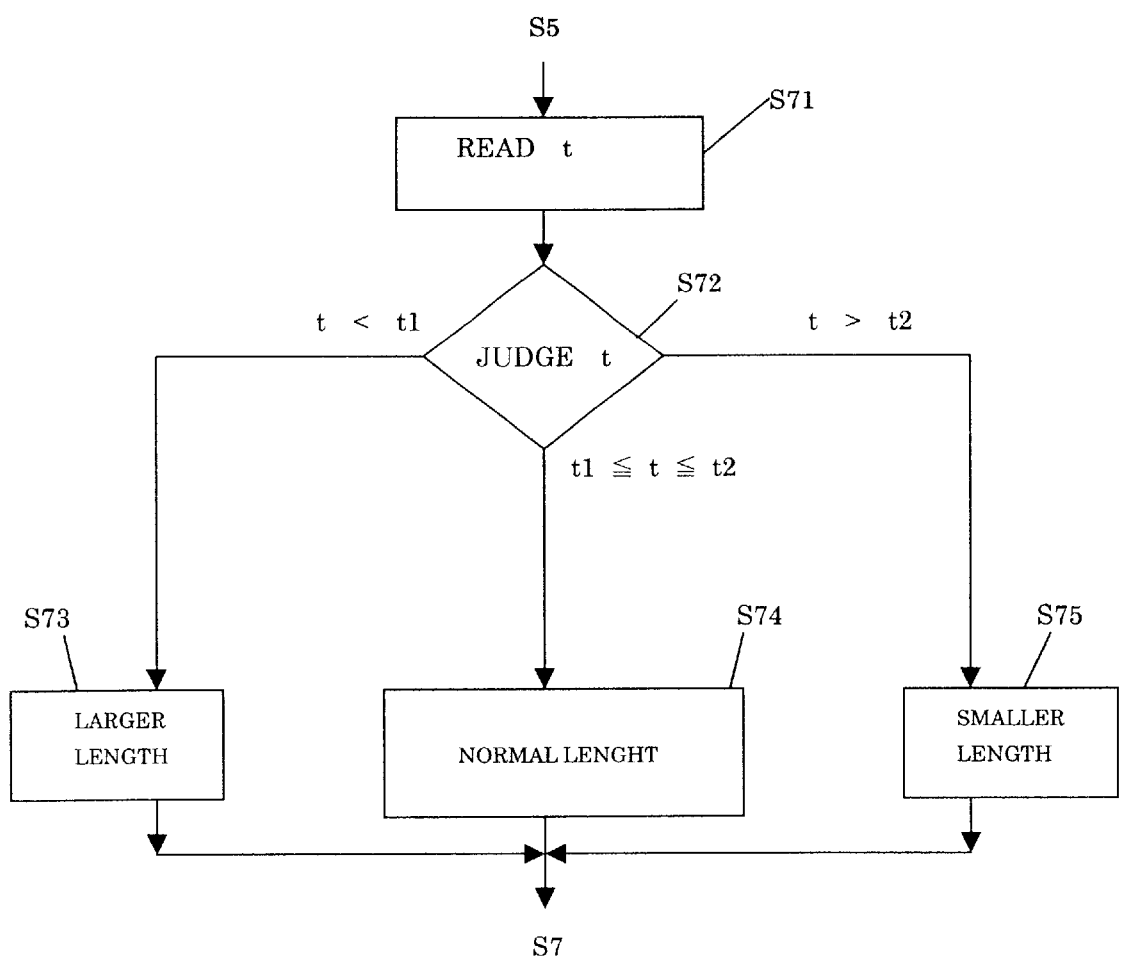
Figure 6:
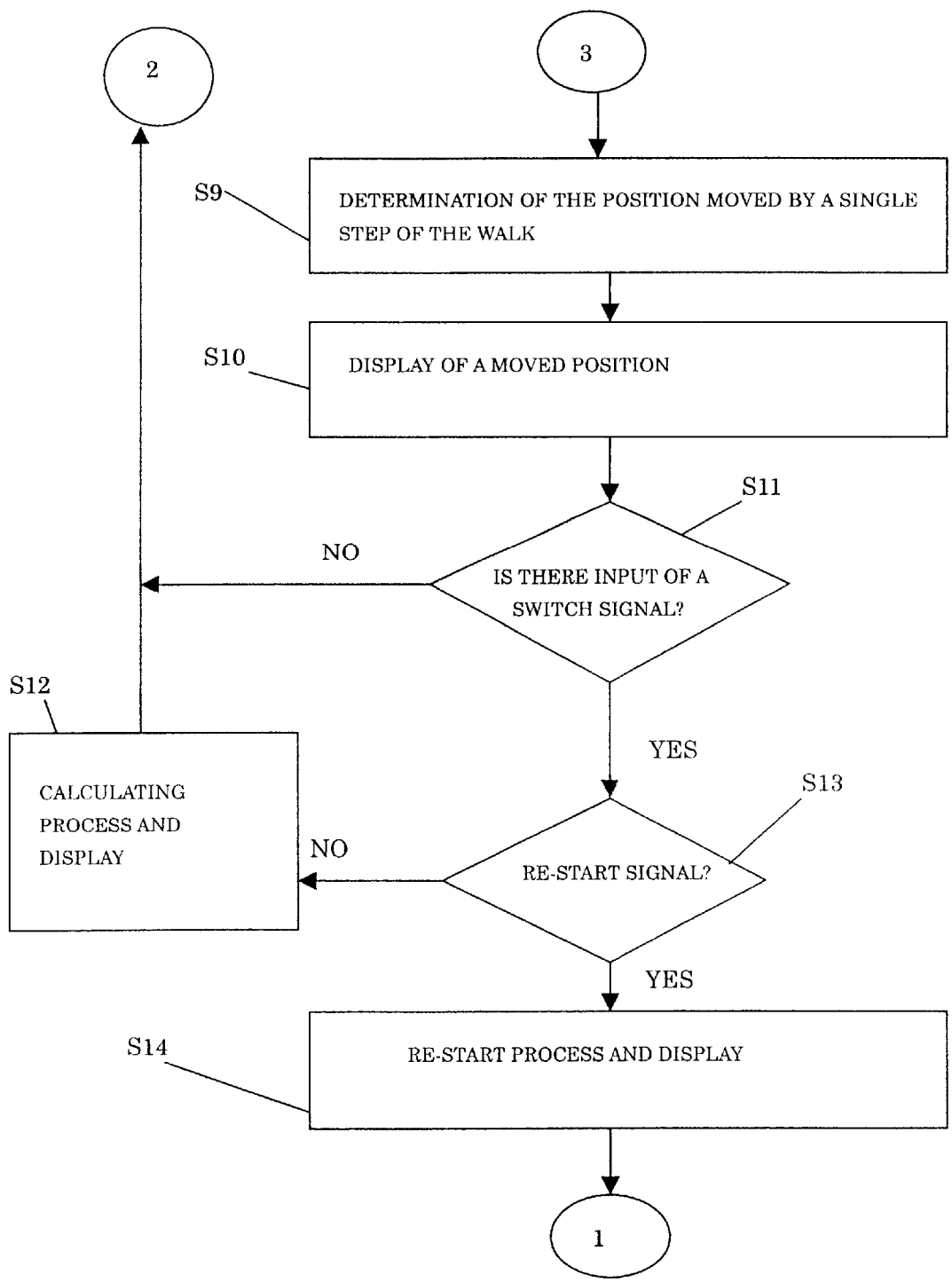
FIG. 6 is a flowchart showing the control program of the portable position detector.

FIG. 5B shows that the walking time t per step is judged to correct the length of a step. That is, in FIG. 5B, in step S71 the walking time t per step is detected. Then, in step S72 the walking time t per step is judged. When it is less than a first predetermined value t1, in step S73 the length of a step is corrected to a larger length. When the walking time t per step is between the first predetermined value t1 and a second predetermined value t2 ($t1 \leq t \leq t2$), the control section 11 judges this walking to be "normal" and advances to step S74. In step S74 the length of a step is corrected to a normal length. When the walking time t per step is greater than the second predetermined value, in step S75 the length of a step is reduced to a smaller length.

Thus, by judging the walking time t per step and correcting the step length, the correction judgment of the step length becomes easy and the accuracy of the step length can be enhanced considerably. Particularly, this case, as compared with the former case (FIG. 5A) where only acceleration is used, is advantageous in that there is no need to view the gain and complicated motion of acceleration, the cost is reduced, and measurements can be made more easily.

If in step 50 the correction of the step length according to the walking state ends, the control section 11 advances to step S7.

In step S7 a moved distance is calculated by self-contained navigation. That is, if a walk signal is input from the pedometer 12 for each step, "the length of a step" is regarded as the moved distance for each step. When a correction is made according to changing environment, the corrected step length is regarded as the moved distance. Also, when a correction is made according to the walking time t per step, the corrected step length is regarded as the moved distance.

Next, in step S8, when the vertical (Z-axis) component of an output signal from the geomagnetic sensor 13 becomes the minimum value, the landed point is detected. Based on this detected point, the moved direction at the time of the walk is selected from among the direction signals being constantly output from the geomagnetic sensor 13 and is determined as a specific moved direction. In this embodiment, while the specific moved direction is determined when a walker lands on the ground, the present invention is not limited to this. For example, the specific moved direction may be determined when the foot of a walker arrives at substantially the highest position. Also, it may be determined when the foot of a walker is in a range between a point delayed from the landed point by a predetermined time and the next landed point. Furthermore, it may be determined when the foot of a walker is in a range between a point delayed from the highest-position arrival point by a predetermined time and the highest position that the walker arrives at by the next walking motion. By selecting a moved direction at a point in this range, the moved direction can be made closer to the moved direction of the center of gravity of a person. The magnitude of the above-mentioned predetermined time that is delayed may be set experimentally or by the proportional portion of the walking cycle calculated by the pedometer 12 or geomagnetic sensor 13.

Next, in step S9 the "moved position" by a single step of a walk is calculated from the aforementioned moved direction and moved distance determined in the aforementioned manner for each step. Then, by adding the current moved position to the position moved from the starting point, the position moved from the starting point caused by the current walking can be obtained.

Figure 7A:
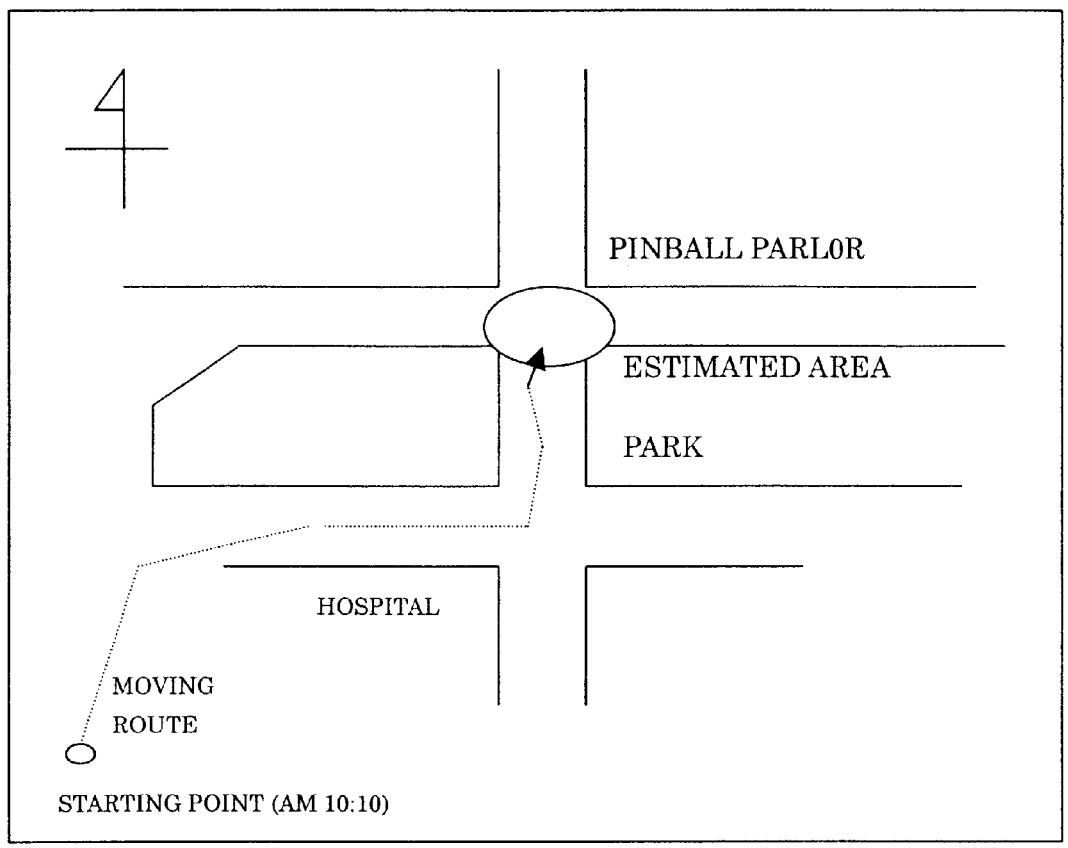
FIGS. 7A and 7B are diagrams used to explain the example of a moving route.
Figure 7B:
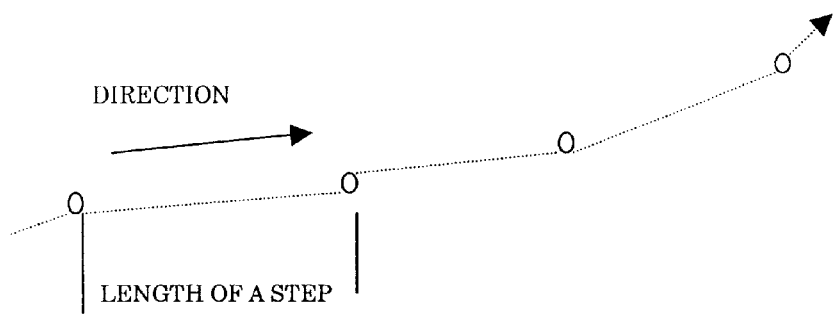

Next, in step S10 the determined moved position is displayed with points (○ marks) on the display 17, as shown in the enlargement of a locus of movement in FIG. 7B. At this time, map information corresponding to the current position of a person, road attribute information at that position (e.g., information about a national road, a prefectural road, etc.), and surrounding information at that position (e.g., main buildings, stations, etc.) are read from the memory card 22 and are displayed on the display 17 as shown in FIG. 7A. This enables a moving person to easily know which position on a map the person is at. At this time, the estimated position is displayed as an area, as shown in FIG. 7A. Note that the estimated position area need not to be displayed.

In addition, in the aforementioned, when a new moved position is displayed, attendant map information, such as the reference position, reference direction, and reduced scale (accordingly, a reference distance) of the map, has been simultaneously read along with map information by the insertion of the memory card 22 in step S2, so this attendant information is also utilized.

Furthermore, at the stage this map information has been displayed, the current position may be guided with a voice-synthesized sound (e.g., "Turn left at the ○○ intersection about 10 m ahead") output from the voice output unit 18. Note that as a person advances further, the area of map information is automatically switched (i.e., the area is scrolled).

Next, in step S11 it is judged whether or not a switch signal (signal from the switch input section 14) has been input. If it has not been input, the control section 11 returns to step S3 and waits for the next signal from the pedometer 112. With this, a locus of movement is displayed on the display 17 in accordance with the walking of a person, as shown in FIG. 7A.

On the other hand, if in step S11 the switch signal has been input, the control section 11 advances to step S13 and judges whether or not the switch signal is a re-start signal. Even if it were mere screen display switching, the control section 11 advances to step S12 if it is not a re-start signal. In step S12 the control section 11 performs a calculating process (e.g., process of calculating a walked distance cumulated from the starting point, etc.) and makes a display (e.g., a switch of a screen display, etc.) Then, the control section 11 returns to step S3 and repeats processing.

If a switch input signal is an input signal to request scrolling of a map area where a walker moves, the control section 11 will receive this input signal and the map area will be scrolled and displayed on the display 17.

In step S13, when the switch signal is a re-start signal, the control section 11 advances to step S14 and performs a re-start process and a display thereof. Then, the control section 11 returns to step S2 and makes re-input of a starting point and the like possible. Note that the re-start here means a case where another route is reset after the arrival of a destination or a case where a route up to now is erased although it is on the way to a destination and then a new route is reset.

Thus, even in the case where the position detector 1 according to the aforementioned embodiment is located in a forest or between buildings where a signal cannot be received from a global positioning system (GPS) due to high buildings, banks, and forests, the position detector 1 can know by self-contained navigation the position of a person carrying this position detector with a portable size and weight applicable to a walker. In this case, at a point in the range where a walker is between the highest position that the walker arrives at by a waling motion and the highest position that the walker arrives at by the next walking motion, the moved direction is determined with a geomagnetic sensor, and based on the determined position, a moved position is calculated. As a result, the moved direction becomes more accurate. Furthermore, the detection of the aforementioned point can easily judge whether it is highest-position arrival or landing by geomagnetic change (or acceleration change detected with a three-dimensional sensor instead of employing the geomagnetic sensor of the above-mentioned embodiment). A point between the highest position and the landed point can also be grasped by delaying a redetermined time.

In addition, by detecting changing environment, the length of a step can be changed during a walk on a slopping road, so that position accuracy can be further enhanced. It is a matter of course that the position detector according to the present invention can be produced at low cost.

Furthermore, in this embodiment, the length of a step is corrected with the time required for a single step of a walk and the horizontal acceleration at this time (or the magnitude of a change in the acceleration). With this, the correction judgement of the step length is easy, the accuracy of the step length can be considerably enhanced, and the calculation accuracy of the moved position can be enhanced. Moreover, for example, if the walking time per step and the acceleration of a walker are employed as parameters, there is an advantage that the correction judgement of the step length is easy.

Now, a second embodiment of the present invention will be described. The second embodiment corrects a moved position and, in some cases, the length of a step with GPS satellite signals.

Figure 8:
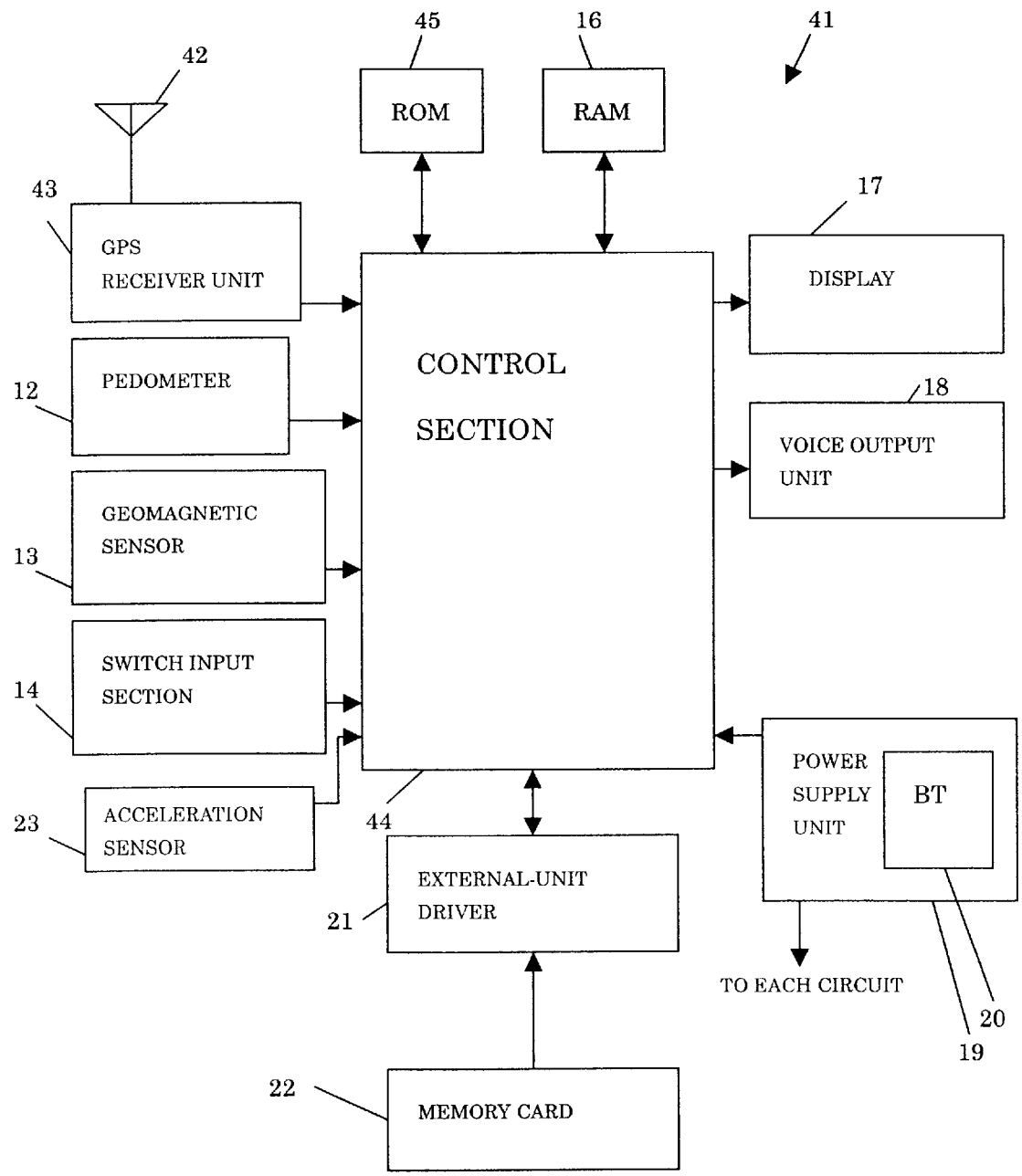
FIG. 8 is a block diagram of a portable position detector according to a second embodiment of the present invention.
Figure 9:
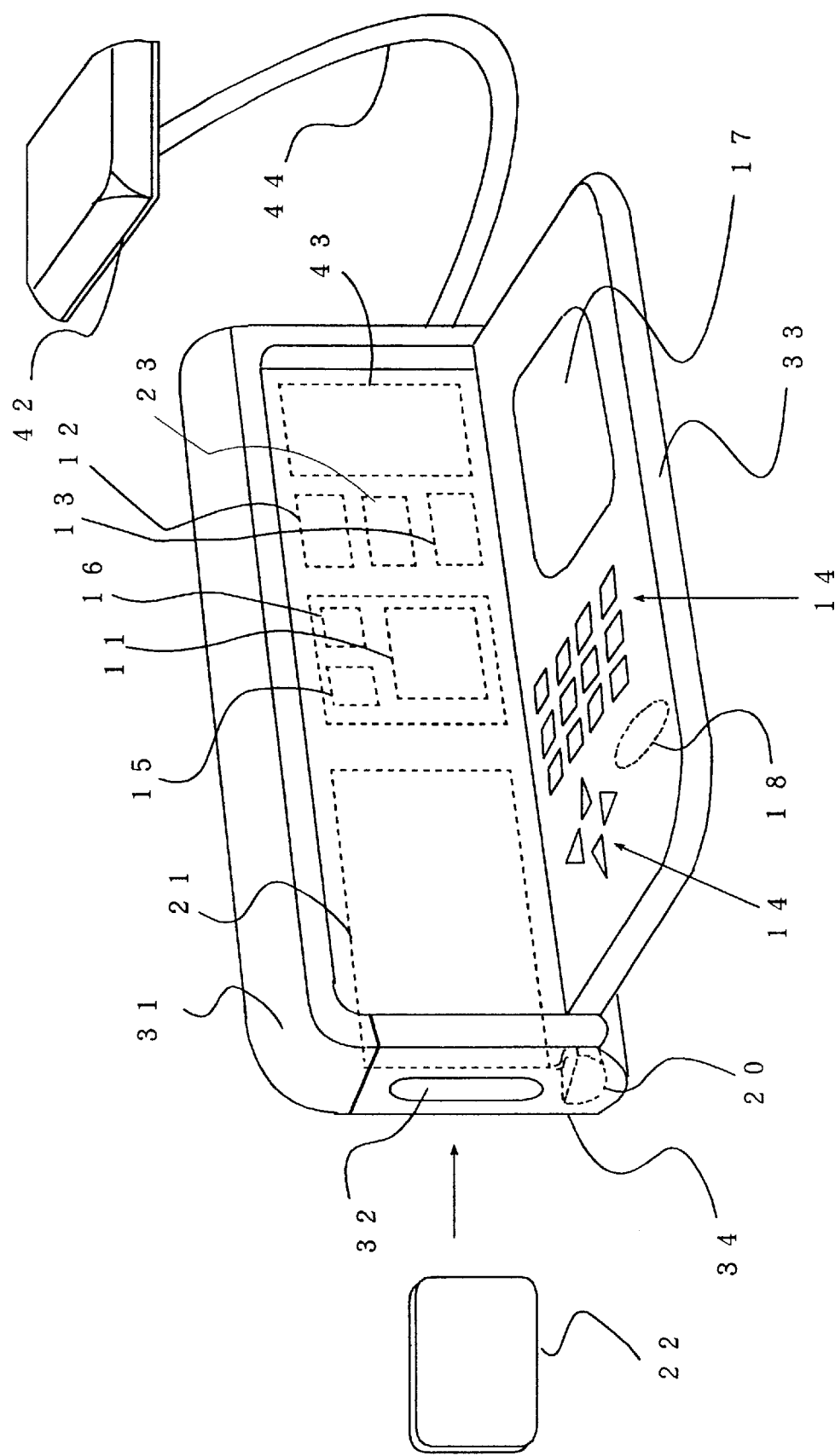
FIG. 9 is a perspective view showing the portable position detector according to the second embodiment of the present invention.

FIG. 8 shows a block diagram of a portable position detector 41 according to the second embodiment of the present invention, and FIG. 9 shows a perspective view of the portable position detector 41. In these figures, the portable position detector 41 differs from the first embodiment in that a GPS antenna 42 and a GPS receiver unit 43 are newly provided and that the contents of the control section 44 and the ROM 45 differ.

The GPS antenna 42 uses, for example, a micro strip patch antenna employing a teflon substrate and having hemispherical directivity, in order to receive a right-handed polarized wave signal of about 1.5 MHz sent from GPS satellites. As shown in FIG. 9, the GPS antenna 42 is attached above a main body 31, for example, onto the shoulder of a person carrying the portable position detector 41 and is connected to the GPS receiver unit 43 via a harness 44'.

The GPS receiver unit 43 receives radio waves for measurement from a plurality of GPS satellites via the GPS antenna 42 and modulates them. Based on the modulated signals, the GPS receiver unit 43 calculates the current position information about the portable position detector 41 (e.g., three-dimensional measurement information including latitude, longitude, and altitude) and outputs the calculated current position information to the control section 44.

The GPS is constructed of 24 satellites respectively disposed four by four in 6 orbits. In principle the GPS receiver unit 43 receives radio waves from the satellites, also calculates a distance between a receiving point and the satellites from a difference between the arrival times, and finally calculates the three-dimensional positions (latitude, longitude, and altitude) of the receiving point. The GPS antenna 42 and the GPS receiver unit 43 constitute a GPS unit.

When the position information, measured and calculated with the GPS satellite signals, is obtained in addition to the position information obtained in the first embodiment, the control section 44 corrects the position estimated by the self-contained navigation with the position information obtained with the GPS satellite signals, in preference to the position information obtained by self-contained navigation in the above-mentioned first embodiment. Also, an average step length is measured and calculated in an interval during which it is judged that a straight-advanced walk has continued on at least a level path of the moving routes of the walker. With this, a previously set step length can be corrected to correspond to a step length closer to the moved step length. As a result, the accuracy of the moved position can be further enhanced. The control section 44, ROM 45, and RAM 16 accomplish functions as position correction means and step length correction means in addition to the function of the first embodiment.

Now, the operation of the second embodiment will be described.

Figure 10:
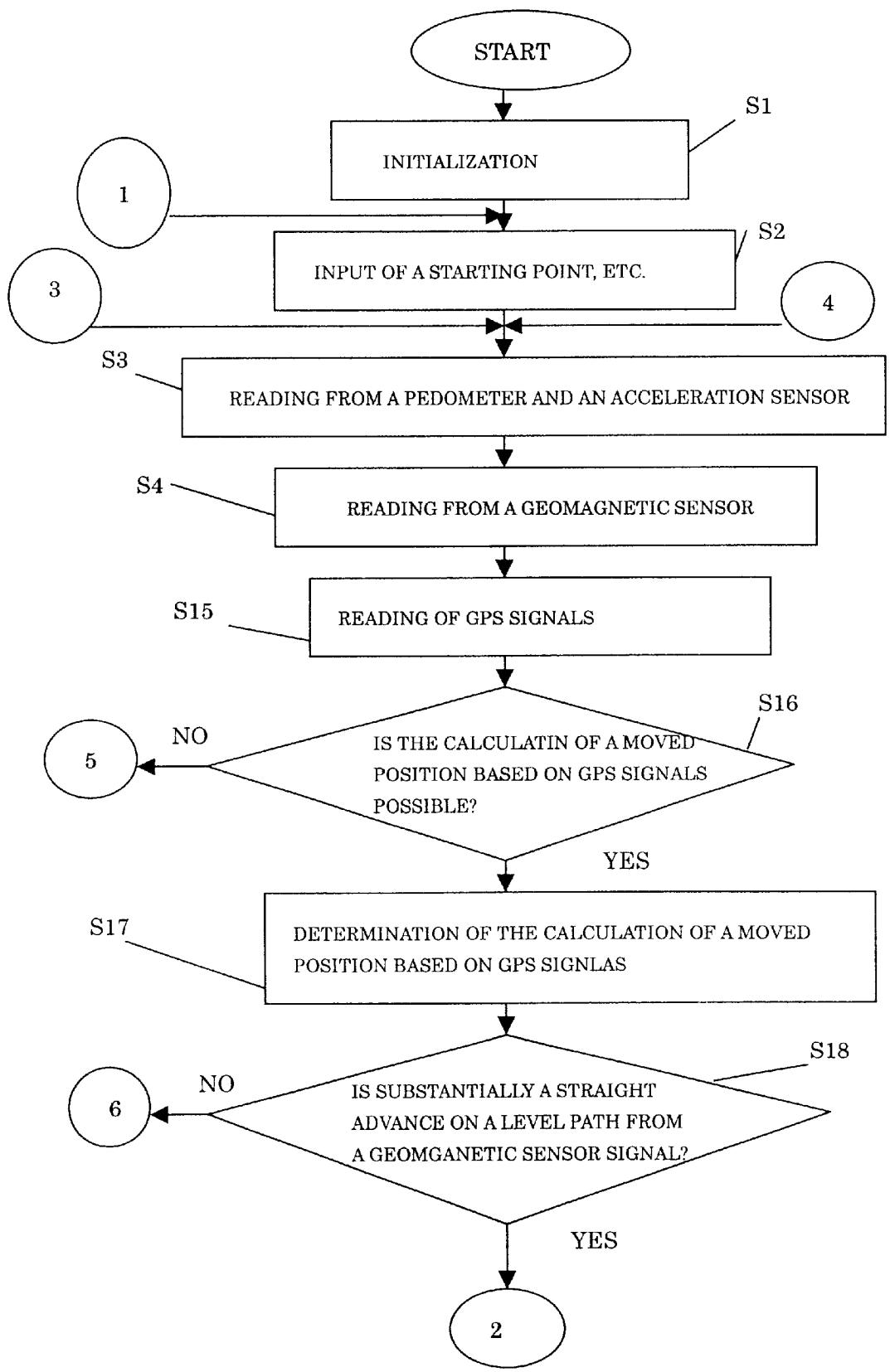
FIG. 10 is a flowchart showing the control program of the portable position detector according to the second embodiment of the present invention.
Figure 11:
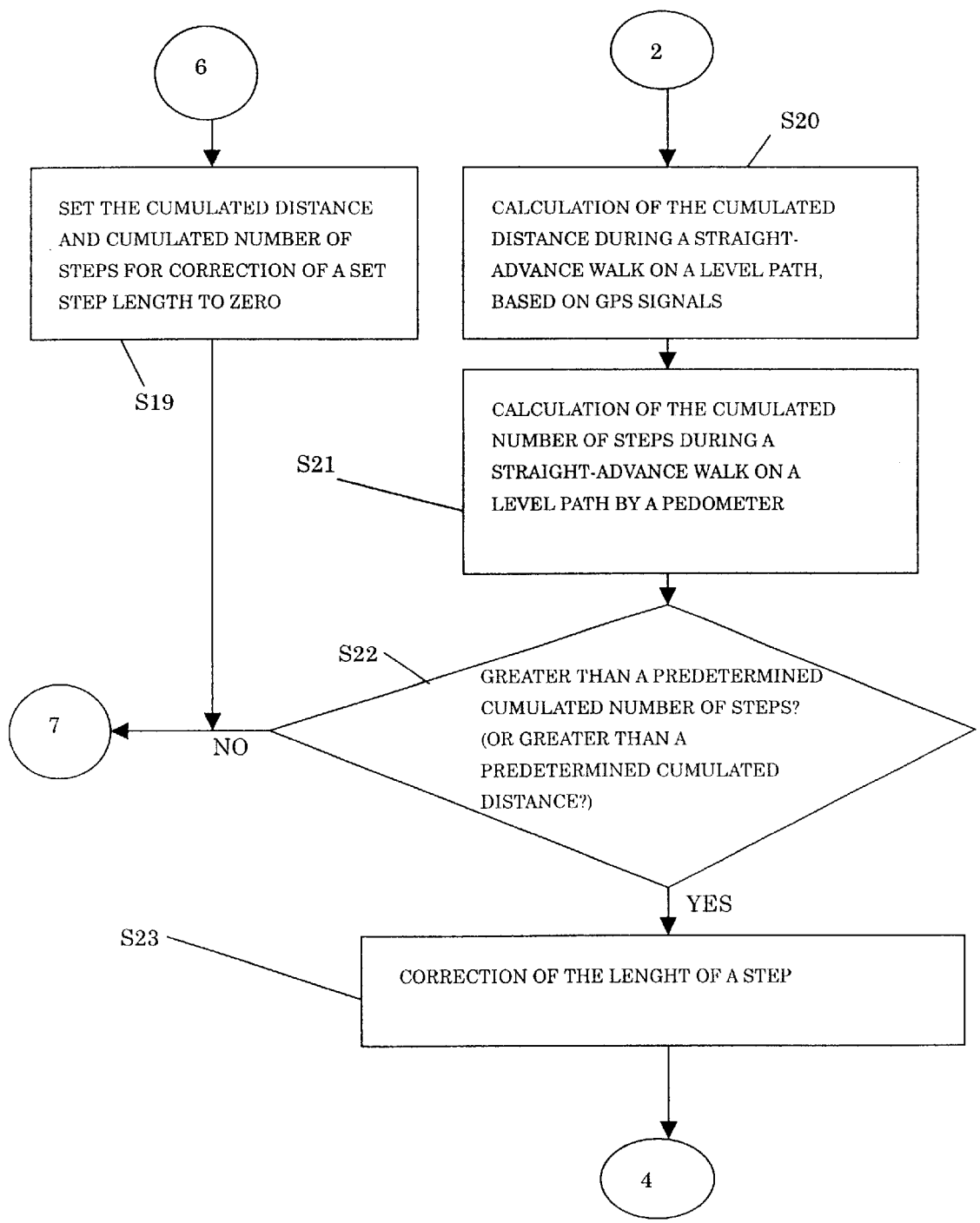
FIG. 11 is a flowchart showing the control program of the portable position detector according to the second embodiment of the present invention.
Figure 12:
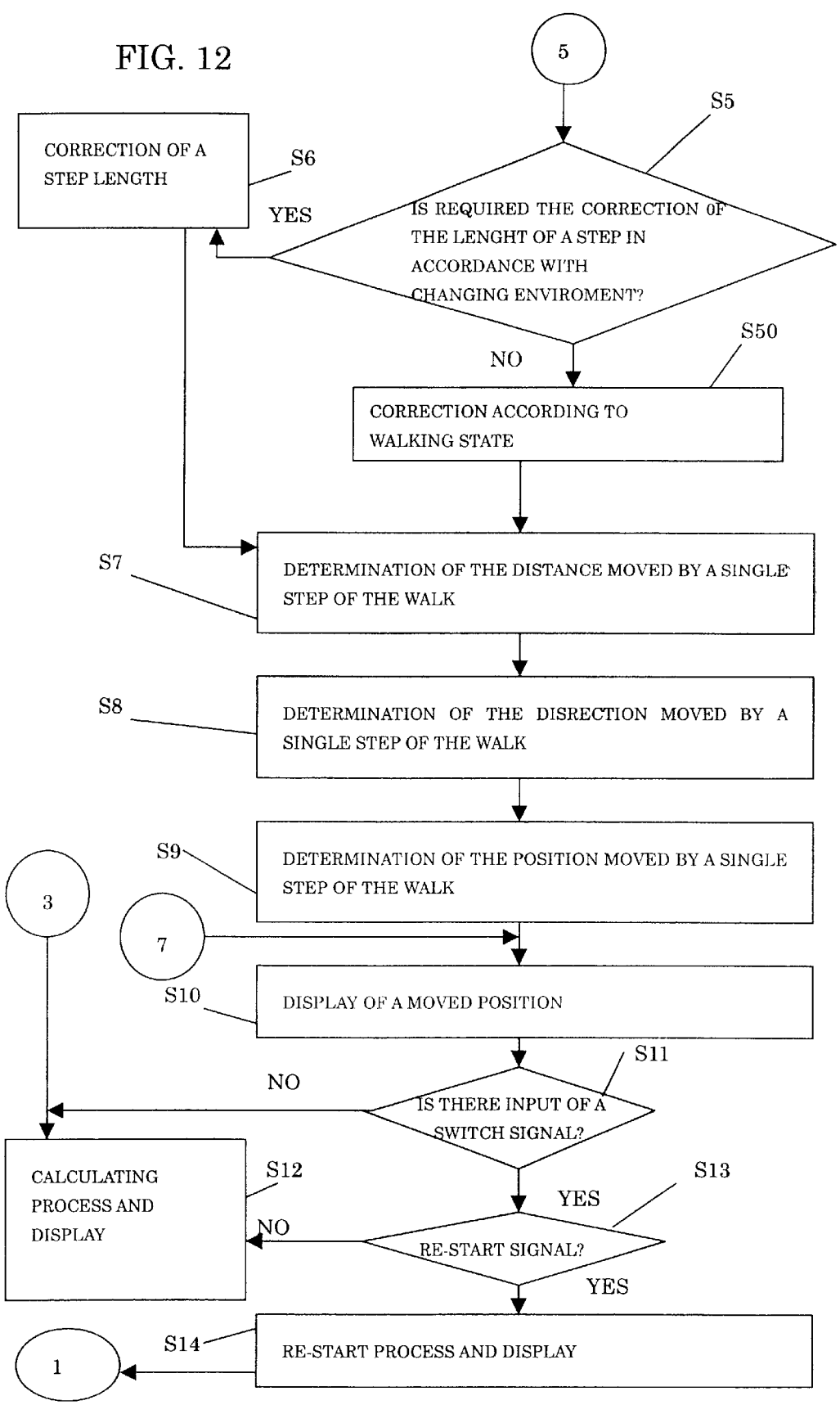
FIG. 12 is a flowchart showing the control program of the portable position detector according to the second embodiment of the present invention.

FIGS. 10 through 12 are flowcharts showing the control program of the portable position detector 41, respectively. In these flowcharts, the same reference numerals will be applied to steps corresponding to the first embodiment and therefore a description thereof is omitted for avoiding redundancy. The steps of performing processes differing from the first embodiment will hereinafter be described with step numbers differing from the first embodiment.

In the control program in the second embodiment, step S15 is executed to read GPS signals after execution of steps S1 through S4. Then, in step S16 it is judged how many GPS signals the control section 44 can receive. If the received GPS signals are 4 or more (even 3 signals are possible although accuracy is reduced), the control section 44 judges that the calculation of a moved position by GPS signals is possible and then advances to step S17. If the received GPS signals are less than that, the control section 44 judges that the measurement of a moved position based on GPS signals is impossible and then advances to step S5.

In step S16, if the control section 44 judges that the measurement of a moved position based on GPS signals is possible, in step S17 the control section 44 calculates and determines the current moved position of a person carrying this portable position detector 41 from the above-mentioned received plurality of GPS signals and advances to step S18 and steps thereafter.

However, in step S16, if the calculation of a moved position by GPS signals is judged to be impossible, in step S5, step S6, step S50, and steps S7 through S9 the moved position, calculated and estimated, is determined from signals output from the pedometer 12, acceleration sensor 23, and geomagnetic sensor 13, the same as the first embodiment. In this determination, in steps S3 and S4 the outputs from the pedometer 12, acceleration sensor 23, and geomagnetic sensor 13 are read in and the current position is determined based on the moved position immediately prior to the determination of the calculation impossibility in step S16, including the quantity of movement and direction calculated in step S5, step S6, step S50, and steps S7 through S9.

If in step S16 the calculation based on GPS signals is judged to be possible and if in step S17 a moved position is calculated and determined based on GPS signals, in step S18 it is determined from the output signal of the geomagnetic sensor whether or not the walking is substantially "a straight advance on a level path". Note that GPS signals may be employed instead of the output signal of the geomagnetic sensor 13. The geomagnetic sensor 13 has better accuracy but has a disadvantage in that it is easily influenced by surrounding metal materials. In the case of a walk on a slop or a walk on a sharp curve, i.e., in the case where it is judged that the walk is not a walk on a level path or that it is not a straight-advanced walk, in step S19 a cumulated moved distance for step length correction and a cumulated number of steps for step length correction are set to zero. In step S10, the moved distance, determined based on the GPS signals in step S17, is displayed.

Note that the cumulated moved distance for step length correction is not a cumulated walked distance from the starting point to the current position. It is a cumulated distance between the start and the end of a straight walk on a level path, provided for correcting a set step length.

On the other hand, in step S18, if the control section 44 judges that the current walk is substantially a "level path" and also a "straight-advanced walk," then the control section 44 advances to step S20. The level path and straight-advanced walk here means that the vertical (Z-axis direction) component detected by the geomagnetic sensor 13 is within a first predetermined value and also the moved direction detected by the geomagnetic sensor 13 is within a second predetermined value. Instep S20, the calculation of a "cumulated moved distance for correction of a set step length" is made with GPS signals, as long as a straight-advanced walk on a level path continues. Then, in step S21, the calculation of a "cumulated number of steps for correction of a set step length" is likewise made, as long as a straight-advanced walk on a level path continues. In the next step S22 it is judged whether or not the aforementioned cumulated number of steps is greater than a predetermined value. Instead of this, it may be judged whether or not the aforementioned cumulated moved distance is greater than a predetermined value. In either case, if it is greater than the predetermined value, in step S23 the above-mentioned cumulated moved distance is divided by the above-mentioned cumulated number of steps to calculate the value of a "corrected step length". The control section 44 replaces the value of the step length input in step S2 with the calculated value and returns to step S3. By employing this value in the calculation of a moved distance, etc, a set step length closer to the actual step length is employed in the walk thereafter. As a result, the accuracy of a moved position is enhanced. As described above, the reason why the cumulated number of steps or cumulated moved distance greater than a predetermined value is employed is that accuracy is enhanced by averaging and that the influence of an error of GPS measurement is reduced.

Note that with the calculated value of the moved distance based on GPS signals, the correction value for the length of a step may be corrected according to the walking time per step and the acceleration of a walker. If done in this manner, the accuracy of the correction of the step length, according to the walking time per step and the acceleration of a walker, can be further enhanced.

Here, steps S18 through S23 constitute the program portion of "set step-length correction means".

In the above-mentioned embodiment, while steps S15 through S23 are inserted between steps S4 and S5 in the first embodiment shown in FIG. 3, the present invention is not limited to this. For example, in FIG. 10 the control section 44 may advance from step S4 to step S5, and steps S15 through S23 may be inserted between steps S9 and S10 of FIG. 4. In this case, the control section 44 advances from step S9 to step S15. In the case of "NO" in step S16 of FIG. 10, the control section 44 may advance to step S10.

Thus, in accordance with the portable position detector of the second embodiment, the position measurement means based on GPS signals is added in addition to the position measurement means based on self-contained navigation which employs the pedometer 12, acceleration sensor 23, and geomagnetic sensor 13 described in the first embodiment. Where the measurement of a position by GPS signals is possible, the position measured by GPS signals having higher accuracy is employed in preference to the position measured by self-contain navigation, and the position based on the self-contained navigation is corrected. Where the measurement of a position by GPS signals is impossible, the measurement results of a moved position by self-contained navigation are employed. Therefore, the second embodiment can know the moved position of a walking body at anyplace, although it is portable. Also, even in the case where the self-contained navigation continues and a cumulated error becomes slightly greater, when the measurement of a position by GPS signals has become possible, the position measured by the self-contained navigation can be corrected with the position measured by GPS signals in order to eliminate the cumulated error. As a result, position accuracy can be enhanced. Even in this case, if the length of a step is corrected according the time required for one step of a walk and the horizontal acceleration at this time (or the magnitude of a change in the acceleration) in the same way as the first embodiment, the accuracy of the step length can be significantly enhanced and the calculation accuracy of the moved distance can be enhanced.

In addition, by employing GPS signals, an average step length is calculated from the walked distance and number of steps during a straight-line walk on a level path, and a previously set step length value is corrected to correspond to the actual step length. As a result, the accuracy of the above-mentioned self-contained navigation can be enhanced.

Now, a third embodiment of the present invention will be described.

Figure 13:
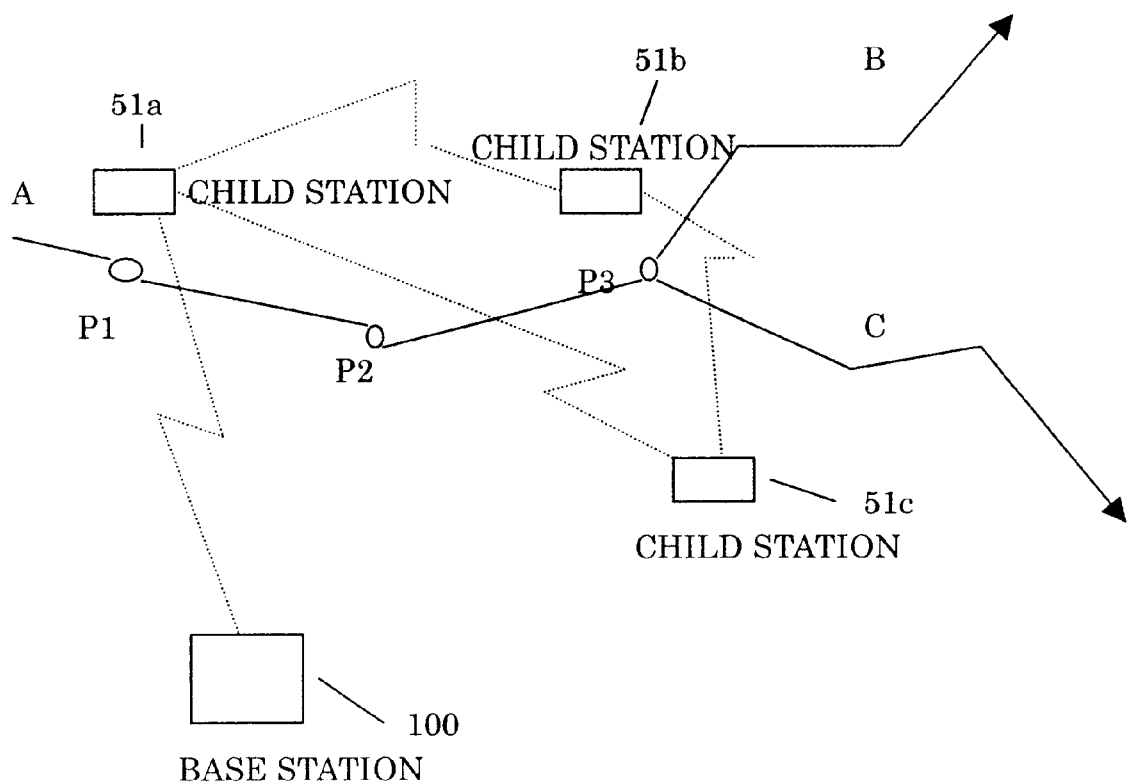
FIG. 13 is a diagram used for explaining mountaineering routes.

The third embodiment, as illustrated in FIG. 13, is applied to a system in which a base station 100 manages a plurality of portable position detectors 51a to 51c that are used as child stations in mountaineering routes. The base station 100 is constructed mainly of a personal computer. The base state 100 uses the portable position detectors 51a to 51c (hereinafter represented by 51) as child stations and manages the moved positions, moving routes, and other necessary information. It is possible to transmit information between the base station 100 and the child station by radio communication. It is also possible to transmit information between the child stations.

The portable position detector 51 is carried as a child station by a person (climber) and detects a moved position by self-contained navigation. As with the second embodiment, the portable position detector 51 makes advantage of signals from GPS satellites to correct the length of a step. Furthermore, the portable position detector 51 transmits necessary information to the base station 100 and receives correction information from the base station 100, thereby performing a moved-position detecting process.

The base station 100 has grasped the details of mountaineering routes. The base station 100 receives information from a plurality of child stations and also accurately detects their positions by taking advantage of signals from GPS satellites, thereby performing a management process necessary for movement of a child station in addition to the transmission of necessary correction information to a child station.

Figure 14:
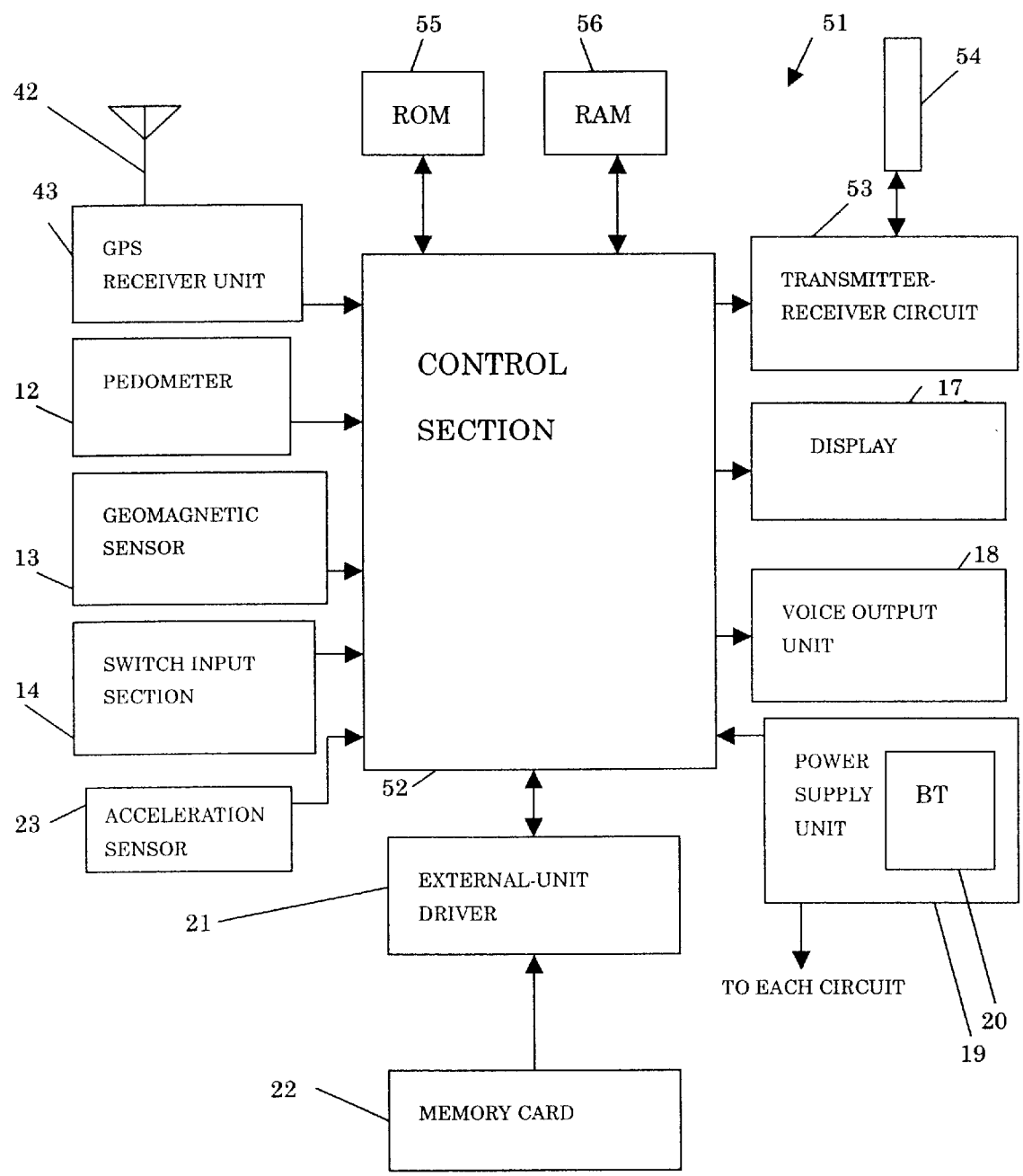
FIG. 14 is a block diagram of a portable position detector according to a third embodiment of the present invention.

Now, the construction of the portable position detector 51 as a child station will be described in reference to FIG. 14. In the figure, the portable position detector 51 differs from the second embodiment in that the contents of a control section 52 and a ROM 55 differ and that a transmitter-receiver circuit 53 and a communication antenna 54 are newly provided. The transmitter-receiver circuit 53 (transmission means and communication means) transmits information about the movement of a child station to the base station 100, also receives correction information transmitted from the base station 100, and furthermore, performs the communication of information between child stations. Note that in the communication with a child station, an ID number for identifying that child station is also transmitted. The communication antenna 54 is used when the transmitter-receiver circuit 53 transmits and receives a radio wave. While the transmitter-receiver circuit 53 uses a small radio transmitter with small power, it may be constructed, for example, of a portable telephone using radio.

The control section 52, in addition to the processes in the second embodiment, performs a correction process in calculating the moved position of the child station based on GPS signals, based on correction information received from the base station 100. Also, the ROM 55 stores the control program of the control section 52, etc. Therefore, the control section 52, ROM 55, and RAM 16 realize the hardware portion of walking-body moved information correction means.

Figure 15:
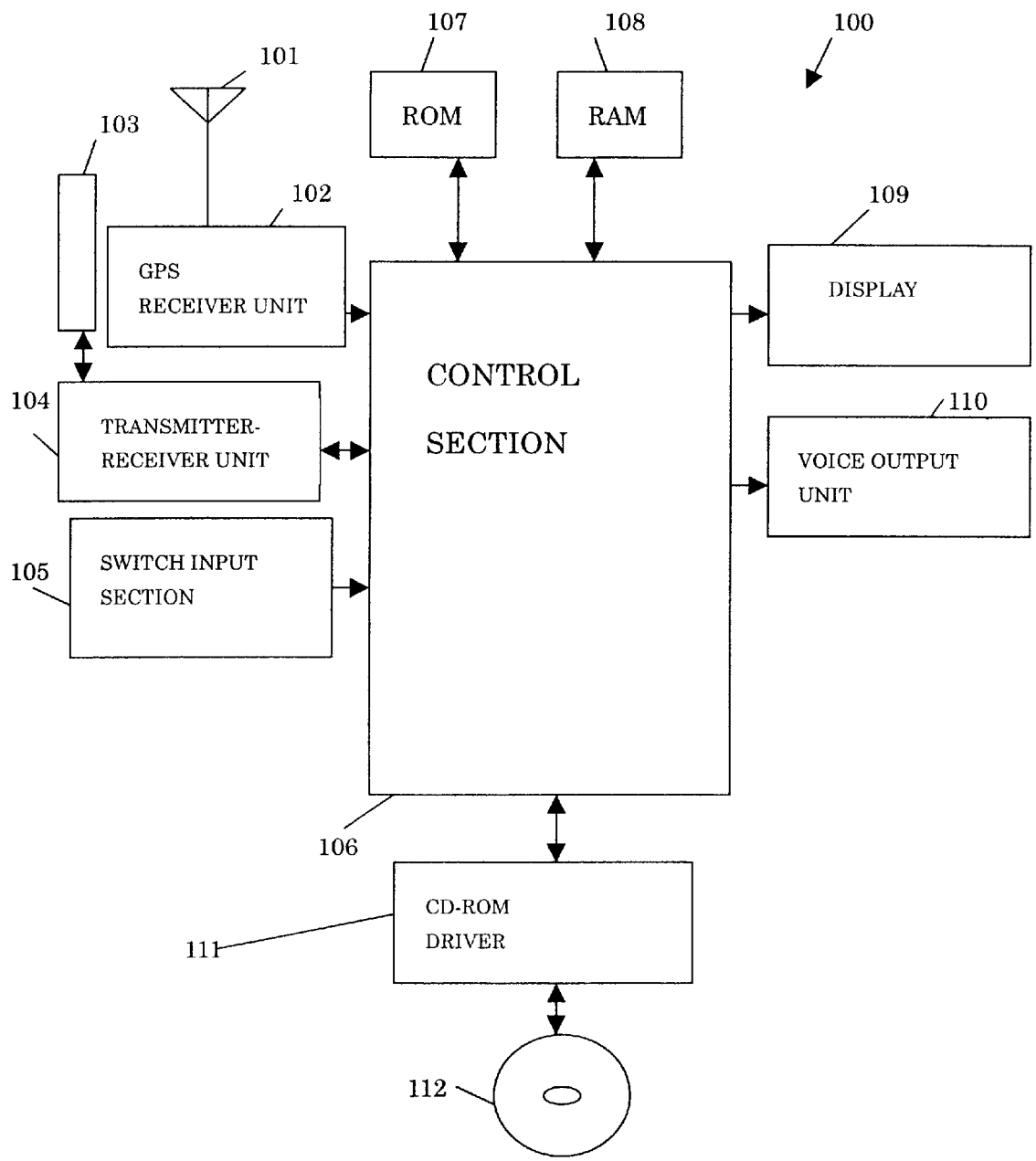
FIG. 15 is a block diagram of a base station.

Now, the construction of the base station 100 will be described in reference to FIG. 15. In the figure, the base station 100 includes a GPS antenna 101, a GPS receiver unit 102, a communication antenna 103, a transmitter-receiver unit 104, a switch input section 105, a control section 106, a ROM 107, a RAM 108, a display 109, a voice output unit 110, and a CD-ROM driver 111. The base station 100 is constructed mainly of a personal computer.

The GPS antenna 101 uses, for example, a micro strip patch antenna employing a teflon substrate and having hemispherical directivity, in order to receive a right-handed polarized wave signal of about 1.5 MHz sent from GPS satellites. The GPS antenna 101 is attached to the exterior of the main body of the base station 100. The GPS receiver unit 102 receives radio waves for measurement from a plurality of GPS satellites via the GPS antenna 101 and modulates them. Based on the modulated signals, the GPS receiver unit 102 calculates the current position information (e.g., three-dimensional measurement information including latitude, longitude, and altitude) of the base station 100 and outputs the calculated current position information to the control section 106.

The transmitter-receiver unit 104 receives child-station information sent from a plurality of child stations through the communication antenna 103. The transmitter-receiver unit 104 also outputs the received child-station information to the control section 106 and transmits the information of the control section 106 to the child station. The transmitter-receiver unit 104 constitutes reception means and correction-information transmission means.

In the base station 100 that has accurately known positions such as latitude, longitude, and altitude by pre-measurement, the control section 106 detects an error component from the pseudo distance, time information, and satellite orbit data sent from GPS signals, and transmits the detected error component to a child station. The control section 106 also displays both the position of the base station 100 and the position information received from a child station via the transmitter-receiver unit 104 onto the screen of the display 109 so that they correspond to the mountaineering-route map data read out of the CD-ROM 112 via the CD-ROM driver 111. Furthermore, the control section 106 performs a necessary process (e.g., setting of a mountaineering route range, setting of the relation between the ID number of a child station and position information, etc.), based on a switch manipulation signal from the switch input section 105. Moreover, the control section 106 changes the screen information of the display 109 (e.g., screen enlargement, displayed-area change, etc.). The control section 106 performs a necessary voice synthesizing process (e.g., a voice-synthesized sound, "the child station started moving," is given when the child station starts moving) and outputs the result to the voice output unit 110. The control section 106 is constructed of a microcomputer including a CPU and performs the above-mentioned control in accordance with the control program stored in the ROM 107.

The switch input section 105 includes a manipulation key for performing a setting manipulation (e.g. setting of a mountaineering route range, setting of the relation between the ID number of a child station and position information, etc.). The switch input section 14 also includes a change key for changing the map information about the movement of a child station and the child-station management information displayed on the screen of the display 109, a power key, and other keys. With the switch input section 105, the latest information, such as a dangerous area, i.e., an area in which a landslide or an avalanche is possible or has occurred, is added to the map information from the CD-ROM 112. With this, they can be synthesized as an area where a walker can move.

Note that a movable area where a child station may move (e.g., a relatively wider area including a mountaineering route and the vicinities) has previously been stored in the CD-ROM 112 that is driven by the CD-ROM driver 111. The spots on the stored movable mountaineering route area can be specified, for example, with coordinates.

The ROM 107 has previously stored a program for child-station control that is performed by the control section 106 and the required data. The RAM 108 has a work area, a first memory area that temporarily stores information input by the switch input section 105, and a second memory area that temporarily stores information to set a retrieval range specified by manipulation of the switch input section 14.

The display 109 is constructed of a liquid crystal display (e.g., a color LCD). The display 109 superimposes the mountaineering-route position information processed by the control section 106 and the mountaineering-route map information read out by the CD-ROM 112 through the CD-ROM driver 111 and displays the superimposed information on the screen thereof. The voice output unit 110 outputs a sound, based on a voice signal synthesized by the control section 106 or sound effect, and consists, for example, of a speaker. Note that power is always supplied to the base station 100 via an indoor power source so that the base station 100 can operate for 24 hr in principle.

The control section 106, ROM 107, and RAM 108 constitute management means and correction means. The display 109 constitutes display means.

Next, the operation of the child station will be described.

Figure 16:
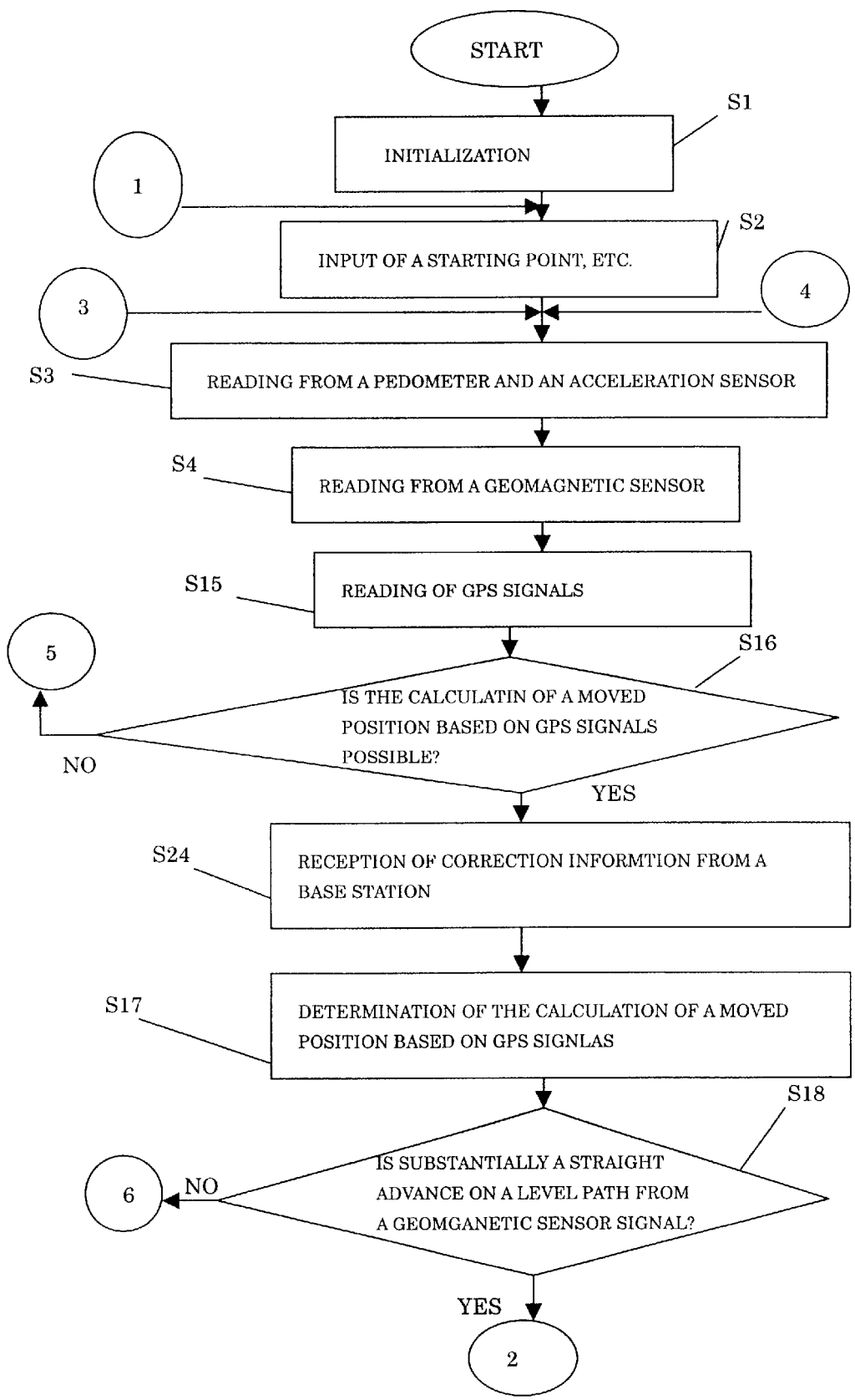
FIG. 16 is a flowchart showing the control program of the portable position detector according to the third embodiment of the present invention.
Figure 17:
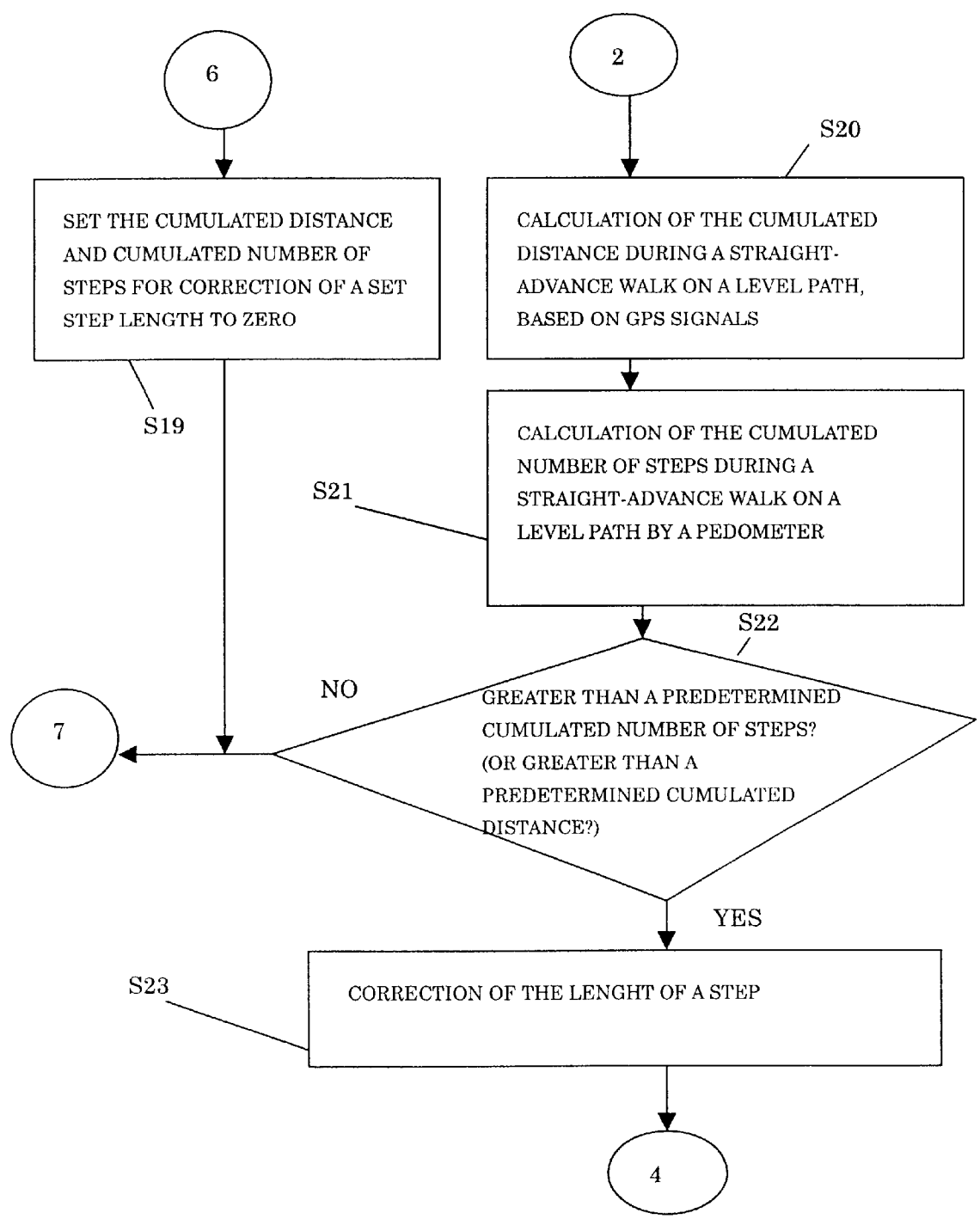
FIG. 17 is a flowchart showing the control program of the portable position detector according to the third embodiment of the present invention.

FIGS. 16 through 18 are flowcharts showing the control program of the child station, respectively. This program is executed if power to the portable position detector 51 (child station) is turned on. In these flowcharts, the same reference numerals will be applied to steps corresponding to the second embodiment and therefore a description thereof is omitted for avoiding redundancy. The steps of performing processes differing from the second embodiment will hereinafter be described with step numbers differing from the second embodiment.

In the control program in the third embodiment, as with the program in the second embodiment, the control section 52 advances to steps S15 and S16 via steps S1~S4. In step S16, if the control section 52 judges from the receivable number of satellites that the calculation of a moved position is possible based on GPS signals, then the control section 52 advances to step S24 added in the third embodiment. In step S24 the control section 52 receives the above-mentioned correction information of the GPS signals from the base station 100, and in step S17, the control section 52 performs the calculation and determination of a moved position based on GPS signals, in view of the correction information. Therefore, the position information obtained in the third embodiment has a smaller error and higher accuracy than the moved position obtained in step S17 of the second embodiment.

After step S17, the control section 52, as with the second embodiment, advances to steps S18~S23 or step S10. After in step S10 a moved position has been displayed, in step S25 the control section 52 transmits the moved position of the child station (the aforementioned corrected position, or when calculations based on GPS signals are impossible, a moved position calculated by self-contained navigation) and the information about the ID number of the child station to the base station 100. Then, the control section 52 advances to step S11. The remaining operation is the same as the second embodiment.

FIG. 19 is a flowchart showing the control program of the base station 100. This program is executed if power to the base station 100 is turned on. If the control program starts, initialization is first performed in step S100. In the initialization, predetermined initialization processes, such as the initial resetting process, the process of clearing the work area of the RAM 108 and the like, are performed. In the initialization, the measurement of a time is also started. Then, in step S101 an area in which the child station moves is set. This setting may be performed on the screen of the display 109 by reading out external data (map data) and displaying it on the display 109, as in step S104 to be described later. In the case where a plurality of mountaineering routes have previously been set, a single mountaineering route may be selected from them.

Note that the planed routes of the child stations have previously been set and input. The "area in which the child station moves" is set for the purpose of tracking and monitoring the actual movement of the child station and obtaining information of whether the child station has been departed from its own route. The latest information, such as traffic impossibility (or danger) due to an avalanche or a landslide, may be input. In this case, the "area in which the child station moves" is set for the purpose of preventing the child station from approaching a dangerous route or avoiding a loss of time.

Next, in step S102, GPS signals (GPS radio waves), including position information transmitted from a plurality of GPS satellites, are received. Based on the received GPS signals, the three-dimensional measurement data (i.e., latitude, longitude, and altitude) of the base station 100 are calculated to detect the current position. Then, in step S103, errors in the GPS signal are detected and corrected from the previously accurately measured position of the base station 100 and the GPS signal information. After this detection, in step S104 the base station 100 transmits information about the aforementioned errors. Next, in step S105 the control section 106 of the base station 100 receives the corrected information from the child station through the transmitter-receiver unit 104. At this time, the control section 106 also receives the ID number of the child station and identifies that child station.

Next, in step S106 an external stored-data retrieving process is performed. In the external stored-data retrieving process, the map information corresponding to a mountaineering route area is retrieved and read out by the CD-ROM 112 through the CD-ROM driver 111. Then, in step 107 the map information corresponding to the mountaineering route area is displayed on the display 109.

Next, in step S108 the position of the base station 100 is displayed on the map, and in step S109 the received current position of the child station is displayed on the display 109 along with the ID number. With this, the operator of the base station 100 can confirm the current position on the map while identifying the child station. In the child-station displaying process, the voice output unit 110 may output a voice-synthesized sound (e.g., "The child station with ID No. ○○ passed now the pond on the ○○ route") so that the current position of the child station corresponding to the ID number is guided. Note that the map information is automatically switched with the movement of a child station (i.e., the map information is scrolled).

Next, in step S110, when there is information to the corresponding child station, the information is input. In step S111, information, such as "A child station is approaching a dangerous area", "A child station is considerably being departed from a planed route" and the like, is transmitted to the corresponding child station, as occasion demands.

In the above-mentioned third embodiment, the base station 100 can monitor a large number of child stations and can guide these child stations or cope with the emergency situation of the child station. The base station 100 can also grasp the position of the child station more accurately, because it adopts a differential method of detecting error information about a GPS signal and correcting the position information of the child station by the GPS signal.

In the above-mentioned third embodiment, while the calculation and correction of a moved distance is made by the child station, the present invention is not limited to this. For example, the child station performs only a necessary and minimum amount of processing and transmits the information to the base station 100, while the base station 100 performs the aforementioned processes and transmits the processed information to the child station. In this case the load on the child station can be reduced.

In the case where the process for obtaining information required of the child station is thus shared by the base station 100 (parent station) and the child station, the child station performs the process of self-contained navigation, while the base station 100 processes part of the GPS signal process. If done in this manner, the child station can know its position at all times while reducing the processing load thereon, even when the radio communication with the base station 100 is broken off or when position cannot be measured by GPS signals.

Note that the calculated value of a moved position with high accuracy based on GPS signals in the base station 100 may be utilized to correct the correction values of step-length correction (the same process as the first embodiment) for many child stations. For example, the base station 100 transmits the correction value for a step length to the child station, while the child state receives it and corrects the step length. If done in this manner, the correction accuracy of a step length, according to the time required for a single step of a walk or the horizontal acceleration (or the magnitude of a change in the acceleration), can be made extremely high at the side of the child station.

While the present invention has been described with reference to the preferred embodiments thereof, the invention is not to be limited to the details given herein, but may be modified in the following manner:

(a) Whether the estimation of a position by the portable position detector is based on GPS signals or based on self-contained navigation may be displayed on the display so that they can be discriminated from each other. If done in this manner, a walker (person) with the portable position detector can move while judging the accuracy of a measured position personally. When an estimated position is not based on GPS satellite signals, it may be displayed in a high-probability area along with a message that the estimated position is based on self-contained navigation.

(b) The walking body that carries the portable position detector is not limited to a person, but may be an animal, a bird or the like. Therefore, this portable position detector is also effective in analyzing the route moved by such a walking body. The walking body also includes an artificial walking body such as a walking robot.

(c) The components of the present invention may be separately dispersed and disposed.

(d) While the above-mentioned embodiments use a memory card as the storage means in the portable position detector, the present invention is not limited to memory cards but may use various storage media. For instance, it may use CD-ROMs, magneto-optical disks, DVD disks, magnetic tape, minidisks, IC cards, optical cards, and so on.

(e) In the above-mentioned embodiments, while the pedometer and the geomagnetic sensor are separately provided, the present invention may employ, for example, only a three-dimensional geomagnetic sensor. In this case, since the three-dimensional geomagnetic sensor can function as a pedometer by a detected vertical geomagnetic change, it can remove the use of the separate pedometer. Thus, the selection of sensors may be freely performed if the objectives of the present invention can be achieved.

(f) In the above-mentioned embodiments, although the moved-direction determination means detects the highest-position arrival point and/or landed point with the geomagnetic sensor alone, it can also detect the points with an acceleration sensor.

(g) The correction of a step length, based on the time required for one step of a walk and the horizontal acceleration at this time (or the magnitude of a change in the acceleration), is not limited to the correcting process described in the above-mentioned embodiments, but other processes may be used. For example, the time required for one step of a walk and the horizontal acceleration at this time (or the magnitude of a change in the acceleration) may be divided into smaller values in accordance with a man, a woman, a child, an adult, an old man, etc. With this, the length of a step can be corrected more accurately.

What is claimed is:

1. A portable position detector for detecting a moved position of a walking body, comprising:

walking-motion detection means for measuring a value related to a walking motion caused by movement of said walking body;

acceleration detection means for detecting acceleration of the value related to the walking motion caused by movement of said walking body;

moved-distance estimation means for estimating the moved distance of said walking body, based on both a number of steps detected from an output of said walking-motion detection means and a step length changed according to horizontal acceleration of said walking body or the magnitude of a change in the horizontal acceleration detected by acceleration detection means;

moved-direction detection means for detecting a direction or direction of movement of said walking body caused by movement of said walking body;

moved-direction determination means further comprising means for detecting two points further comprising a first point at which said walking body arrives substantially at a highest position and a second point at which said walking body lands, based on an output of said walking-motion detection means, and means for determining a moved direction at a specific location related to at least one of the first point and the second point and specified in a range between said first position and a succeeding position being a subsequent highest position at which said walking body arrives; and moved-position estimation means for estimating a position of said walking body after movement, based on said moved distance of said walking body estimated by said moved-distance estimation means and said specific moved direction determined by said moved-direction determination means.

2. The portable position detector as set forth in claim 1, wherein said moved-distance estimation means counts the number of steps on the basis of a vertical geomagnetic change caused by walking of said walking body, detected by said walking-motion detection means, and also estimates the moved distance from a relation of the counted number of steps and the length of a step and wherein the step length is corrected based on the output of said acceleration detection means when the estimation is performed.

3. The portable position detector as set forth in claim 1, wherein said moved-direction determination means judges and detects at least one of the first point and the second point from a vertical acceleration change caused by walking of said walking body, and also determines a moved direction of said walking body at a specific point as a specific moved direction, the specific point being at least one of said first point and second point, or being a point delayed therefrom by a predetermined time.

4. The portable position detector as set forth in claim 3, wherein said predetermined time that is delayed by said moved-direction determination means is determined as a proportional portion of a walking step period from a walking cycle.

5. The portable position detector as set forth in claim 3, wherein said predetermined time that is delayed by said moved-direction determination means is set to a time at which said specific point goes to a state in which a landed foot and a next foot are positioned side by side.

6. The portable position detector as set forth in claim 1, wherein said moved-direction determination means judges and detects at least one of the first point and the second point from a vertical geomagnetic change caused by walking of said walking body, and also determines a moved direction of said walking body at a specific point as a specific moved direction, the specific point being at least one of said first point and second point, or being a point delayed therefrom by a predetermined time.

7. The portable position detector as set forth in claim 6, wherein said predetermined time that is delayed by said moved-direction determination means is determined as a proportional portion of a walking step period from a walking cycle.

8. The portable position detector as set forth in claim 1, wherein said moved-distance estimation means detects changing environment from acceleration change or geomagnetic change caused by movement of said walking body, also changes said length of a step, based on the detected changing environment, and calculates said moved-distance estimation and wherein the step length is corrected based on the output of said acceleration detection means when the calculation is made.

9. The portable position detector as set forth in claim 8, wherein the correction of said step length is performed by making said step length shorter than a step length during a walk on a level path, when it is judged by the detection of said changing environment that a walking path has a slope greater than a predetermined value.

10. The portable position detector as set forth in claim 1, further comprising:
a unit for receiving radio waves from global positioning system (GPS) satellites and measuring the current position of said walking body; and
position correction means for correcting the current position estimated by said position estimation means, when the current position is measured with said unit.

11. The portable position detector as set forth in claim 10, wherein
when the moved direction detected by said moved-direction detection means or said specific moved direction determined by said moved-direction determination means is within a predetermined direction width and also when it is judged by the detection of a changing environment that a cumulated of steps or a cumulated moved-distance, in which a vertical amount of movement is within a predetermined width, is a straight-advanced walk on a level path which continues for a predetermined time or more, a correction of the step length in said moved-distance estimation means is performed by a value obtained by dividing a calculated distance by said cumulated number of steps, the calculated distance being calculated from positions measured at a starting point and an ending point of said straight-advanced walk on a level path by said unit.

12. A portable position detector for detecting a moved position of a walking body, comprising:
walking-motion detection means for measuring a value related to a walking motion caused by movement of said walking body;
acceleration detection means for detecting acceleration of the value related to the walking motion caused by movement of said walking body;
moved-distance estimation means for estimating the moved distance of said walking body, based on both a number of steps detected from an output of said walking-motion detection means and a step length changed in a direction where the step length becomes a wider step length as a time required for one step of a walk detected from an output of said walking-motion detection means becomes shorter;
moved-direction detection means for detecting a direction or direction of movement of said walking body caused by movement of said walking body;
moved-direction determination means further comprising means for detecting two points further comprising a first point at which said walking body arrives substantially at a highest position and a second point at which said walking body lands, based on an output of said walking-motion detection means, and
means for determining a moved direction at a specific location related to at least one of the first point and the second point and specified in a range between said first position and a succeeding position being a subsequent highest position at which said walking body arrives; and
moved-position estimation means for estimating a position of said walking body after movement, based on said moved distance of said walking body estimated by said moved-distance estimation means and said specific moved direction determined by said moved-direction determination means.

13. The portable position detector as set forth in claim 2, wherein
even when said time required for one step of a walk is shorter than normal time required for one step of a walk, said step length is corrected so that said time required for one step of a walk becomes shorter, if the horizontal acceleration of said walking body or a change in said acceleration detected by said acceleration detection means during this walking is less than a first predetermined value; and
even when said time required for one step of a walk is longer than normal time required for one step of a walk, said step length is corrected so that said time required for one step of a walk becomes longer, if the horizontal acceleration of said walking body or a change in said acceleration detected by said acceleration detection means during this walking is greater than a second predetermined value.

14. The portable position detector as set forth in claim 12, wherein said moved-direction determination means judges and detects at least one of the first point and the second point from a vertical acceleration change caused by walking of said walking body, and also determines a moved direction of said walking body at a specific point as a specific moved direction, the specific point being at least one of said first point and second point, or being a point delayed therefrom by a predetermined time.

15. The portable position detector as set forth in claim 2, wherein said moved-direction determination means judges and detects at least one of the first point and the second point from a vertical geomagnetic change caused by walking of said walking body, and also determines a moved direction of said walking body at a specific point as a specific moved direction, the specific point being at least one of said first point and second point, or being a point delayed therefrom by a predetermined time.

16. The portable position detector as set forth in claim 12, wherein said moved-distance estimation means detects changing environment from acceleration change or geomagnetic change caused by movement of said walking body, also changes said length of a step, based on the detected changing environment, and calculates said moved-distance estimation and wherein the step length is corrected based on the output of said acceleration detection means when the calculation is made.

17. The portable position detector as set forth in claim 12, further comprising:
   a unit for receiving radio waves from global positioning system (GPS) satellites and measuring a current position of said walking body; and
   position correction means for correcting the current position estimated by said position estimation means, when the current position is measured with said unit.

18. A position management system comprising:
   a portable position detector for detecting a moved position of a walking body, the portable position detector including
   (1) walking-motion detection means for measuring a value related to a walking motion caused by movement of said walking body,
   (2) acceleration detection means for detecting acceleration of a value related to the walking motion caused by movement of said walking body,
   (3) moved-distance estimation means for estimating the moved distance of said walking body, based on both a number of steps detected from an output of said walking-motion detection means and a step length changed according to either the time required for one step of a walk detected during said walking motion, or-horizontal acceleration of said walking body detected by acceleration detection means, or a magnitude of a change in the horizontal acceleration,
   (4) moved-direction detection means for detecting a direction or direction of movement of said walking body caused by movement of said walking body,
   (5) moved-direction determination means further comprising
      means for detecting two points further comprising a first point at which said walking body arrives substantially at a highest position and a second point at which said walking body lands, based on an output of said walking-motion detection means, and
      means for determining a moved direction at a specific location related to at least one of the first point and the second point and specified in a range between said first position and a succeeding position being a subsequent highest position at which said walking body arrives; and
   (6) moved-position estimation means for estimating a position of said walking body after movement, based on said moved distance of said walking body estimated by said moved-distance estimation means and said specific moved direction determined by said moved-direction determination means, and
   (7) transmission means for transmitting at least one piece of information of output information from said walking-motion detection means, from said moved-distance estimation means, from said moved-direction determination means, and from said moved-position estimation means; and a base station including (1) reception means for receiving the output information transmitted by said transmission means of said portable position detector and (2) display means for displaying a moved position of said portable position detector, based on the information from said reception means.

19. The position management system as set forth in claim 18, wherein
   at least a portion of information necessary for a process of calculating a position of said portable position detector on the basis of a GPS signal received by said portable position detector is transmitted from said portable position detector to said base station;
   said base station receives said portion of information and performs said position calculating process; and
   in said portable position detector, a calculating process is shared with said portable position detector and said base station so that said base station executes processes other than said position calculating process.

* * * * *